United States Patent
Roozbeh et al.

(10) Patent No.: US 12,499,046 B2
(45) Date of Patent: Dec. 16, 2025

(54) SYSTEM AND METHOD FOR CACHE POOLING AND EFFICIENT USAGE AND I/O TRANSFER IN DISAGGREGATED AND MULTI-PROCESSOR ARCHITECTURES VIA PROCESSOR INTERCONNECT

(71) Applicant: Telefonaktiebolaget LM Ericsson (publ), Stockholm (SE)

(72) Inventors: Amir Roozbeh, Stockholm (SE); Chakri Padala, Bangalore (IN); Alireza Farshin, Stockholm (SE)

(73) Assignee: Telefonakiebolaget LM Ericsson (publ), Stockholm (SE)

( * ) Notice: Subject to any disclaimer, the term of this patent is extended or adjusted under 35 U.S.C. 154(b) by 60 days.

(21) Appl. No.: 18/293,354

(22) PCT Filed: Oct. 14, 2021

(86) PCT No.: PCT/SE2021/051016
§ 371 (c)(1),
(2) Date: Jan. 29, 2024

(87) PCT Pub. No.: WO2023/014252
PCT Pub. Date: Feb. 9, 2023

(65) Prior Publication Data
US 2025/0094350 A1    Mar. 20, 2025

(30) Foreign Application Priority Data
Aug. 5, 2021  (IN) .............................. 202111035279

(51) Int. Cl.
*G06F 12/084*    (2016.01)

(52) U.S. Cl.
CPC .... *G06F 12/084* (2013.01); *G06F 2212/1024* (2013.01); *G06F 2212/1048* (2013.01)

(58) Field of Classification Search
CPC ............. G06F 12/0813; G06F 12/0817; G06F 12/0831; G06F 12/084; G06F 12/0842;
(Continued)

(56) References Cited

U.S. PATENT DOCUMENTS

| 9,256,539 B2 | 2/2016 | Cudak et al. |
| 2007/0121615 A1* | 5/2007 | Weill .................... H04L 45/306 370/389 |

(Continued)

FOREIGN PATENT DOCUMENTS

| WO | 2018198561 A1 | 11/2018 |
| WO | 2020256610 A1 | 12/2020 |
| WO | 2022265552 A1 | 12/2022 |

OTHER PUBLICATIONS

International Search Report and Written Opinion, Application No. PCT/SE2021/051016, Apr. 25, 2022, 10 pages.

*Primary Examiner* — Hashem Farrokh
(74) *Attorney, Agent, or Firm* — Nicholson De Vos Webster & Elliott LLP

(57) ABSTRACT

A method of cache pooling is presented where the method includes determining whether a cache of a primary processor assigned to execute an application has insufficient storage space to allot for the application, select at least one alternative processor from a list of alternative processors based on a cache availability or metric for each processor in the list of alternative processors, configuring the primary processor and the selected at least one alternative processor for mutual cache visibility, and configure routing of traffic to the application to be divided between the primary processor cache and the selected at least one alternative processor cache.

18 Claims, 11 Drawing Sheets

(58) Field of Classification Search
CPC ..... G06F 2212/1024; G06F 2212/1048; G06F 9/5016
USPC ........................................................ 711/130
See application file for complete search history.

(56) References Cited

U.S. PATENT DOCUMENTS

| | | | |
|---|---|---|---|
| 2016/0239420 A1* | 8/2016 | Agarwal | G06F 12/0871 |
| 2018/0113744 A1 | 4/2018 | Borlick et al. | |
| 2019/0354402 A1* | 11/2019 | Bivens | G06F 9/5077 |
| 2020/0019476 A1* | 1/2020 | Arevalo | G06F 12/0815 |
| 2022/0232090 A1* | 7/2022 | Vinayakumar | G06F 11/3065 |

* cited by examiner

SYSTEM AND METHOD FOR CACHE POOLING AND EFFICIENT USAGE AND I/O TRANSFER IN DISAGGREGATED AND MULTI-PROCESSOR ARCHITECTURES VIA PROCESSOR INTERCONNECT

CROSS-REFERENCE TO RELATED APPLICATIONS

This application is a National stage of International Application No. PCT/SE2021/051016, filed Oct. 14, 2021, which claims priority to India application No. 202111035279, filed Aug. 5, 2021, which are hereby incorporated by reference.

TECHNICAL FIELD

Embodiments of the invention relate to the field of resource pooling; and more specifically, to processes and systems to manage cache pooling.

BACKGROUND ART

Computer systems include a set of resources that can be employed to execute programs including processing resources, electronic storage resources, communication resources, and similar resources. The processing resources can include various types of processing units such as central processing units (CPUs), graphics processing units (GPUs), and similar processing components. These processors can be connected to a set of electronic storage resources, which store programs and providing working space for processing of data. The processor can fetch program instructions and data from a main memory, or storage device, which is expensive in terms of high access latency of slow main memory or storage device. Using on-chip or local caches (i.e., within the processing device or in a system on a chip (SOC) configuration or similar architectures is a method to reduce memory latency by exploiting a temporal and spatial locality of memory accesses to these on-chip or SOC caches. However, not all programs utilize the caches to the same extent or to the same advantage in terms of processing efficiency. Some programs gain significant performance from the availability and size of the local cache. Other programs do not experience as significant of a gain from the use of a local cache or do not require a large cache.

In some processors, a highspeed interconnect processor link such as quick path interconnect (QPI)/ultra-path interconnect (UPI) enables communication and resource sharing between the processors. A processor can read/write from/to memory a single cache line at a time. Enabling access to cache lines by multiple processors however creates issues for maintaining cache coherency and resource sharing. High speed inter-processor links and similar technology can be used between any number of processors including small sets of processors used in servers or similar computing devices, as well, as large sets of processors within data centers.

Traditional data center architecture consists of racks of server blades that are networked together. Each server blade is self-contained with resources such as processors, memory, storage, and input/output (I/O) peripherals. Since the resources that make up server blades are within the physical confinement of a 'box', replacing or augmenting any of the components in case of failure causes other resources in the server to also be out of use for a period of time. This induces inflexibility in large scale data centers with respect to maintenance and upgrade of resources. Another issue with traditional server blades is the static nature of its composition, once deployed it cannot be automatically recomposed with different quantities of resources to suit different workloads in a data center.

SUMMARY

In one embodiment, a method of cache pooling includes determining whether a cache of a primary processor assigned to execute an application has insufficient storage space to allot for the application, selecting at least one alternative processor from a list of alternative processors based on a cache availability or metric for each processor in the list of alternative processors, configuring the primary processor and the selected at least one alternative processor for mutual cache visibility, and configuring routing of traffic to the application to be divided between the primary processor cache and the selected at least one alternative processor cache.

In another embodiment, a machine-readable medium comprises computer program code which when executed by a computer carries out the method of cache pooling that includes determining whether a cache of a primary processor assigned to execute an application has insufficient storage space to allot for the application, selecting at least one alternative processor from a list of alternative processors based on a cache availability or metric for each processor in the list of alternative processors, configuring the primary processor and the selected at least one alternative processor for mutual cache visibility, and configuring routing of traffic to the application to be divided between the primary processor cache and the selected at least one alternative processor cache.

In a further embodiment, an electronic device comprises a machine-readable storage medium having stored therein a cache coordinator, and a processor coupled to the machine-readable storage medium, the processor to execute the cache coordinator to perform the method of cache pooling includes determining whether a cache of a primary processor assigned to execute an application has insufficient storage space to allot for the application, selecting at least one alternative processor from a list of alternative processors based on a cache availability or metric for each processor in the list of alternative processors, configuring the primary processor and the selected at least one alternative processor for mutual cache visibility, and configuring routing of traffic to the application to be divided between the primary processor cache and the selected at least one alternative processor cache.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
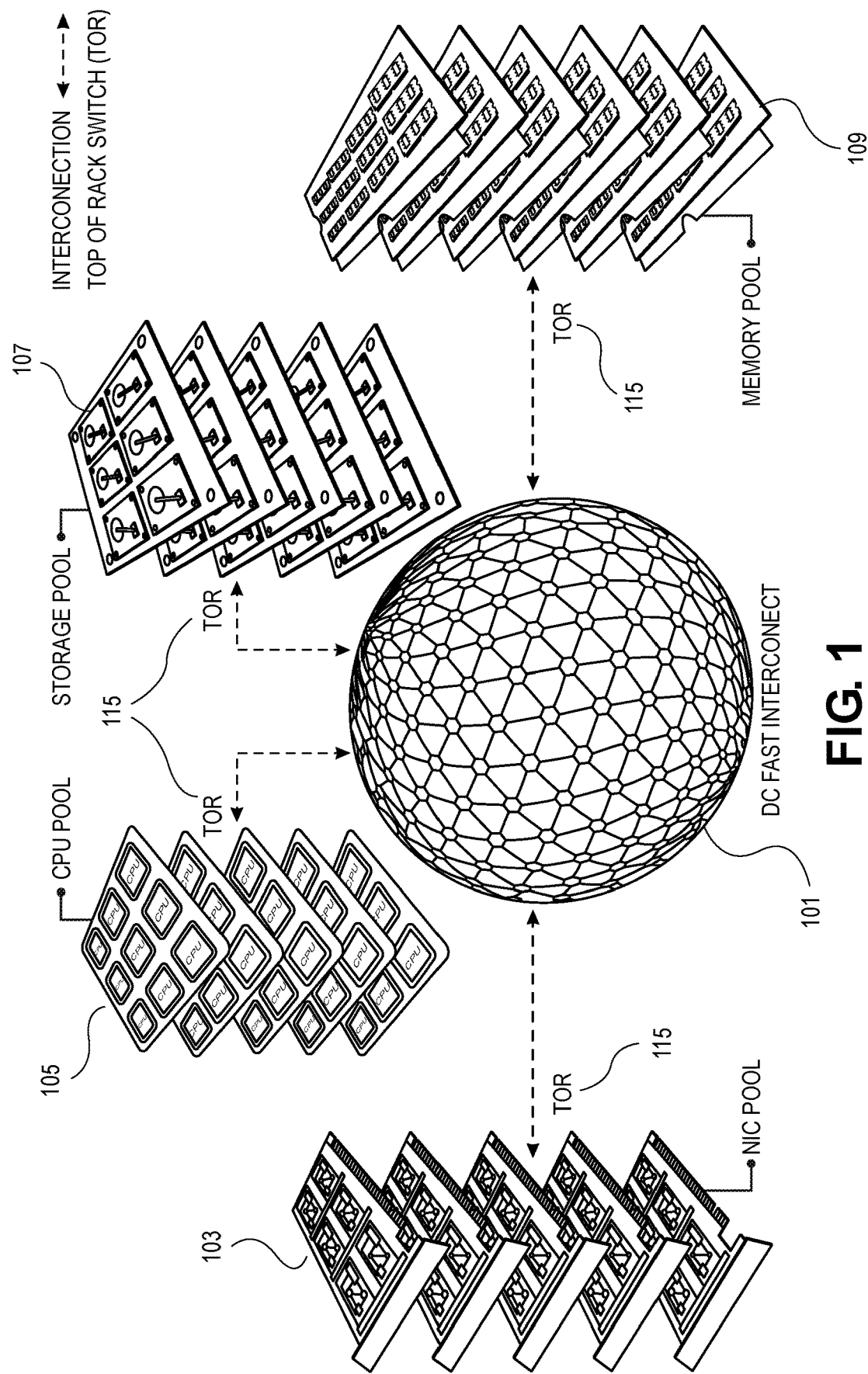
FIG. 1 is a diagram of one embodiment of an example data center.

The following description describes methods and apparatus for cache pooling. The embodiments, provide a process that can allocate cache resources to applications as they are initialized, as well as, determine when the cache resource allocations are insufficient or sub-optimal for the operation of the programs assigned to a set of processors in the system. A 'set,' as used herein, refers to any positive whole number of items including one item. In response to detecting insufficient or sub-optimal cache resource allocations, a cache coordinator can identify other processors in a group or 'zone' with pooled cache resources that can be utilized, and reallocate the cache resources for a program to incorporate the available cache resources of other processors in the zone that are available for utilization. The cache coordinator can also configure the processors in the zone for mutual visibility and configure routing of cache traffic between processor as needed to adjust for the reallocation of cache resources.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set of one or more physical network interface(s)

(NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Processors can include multiple levels of caches to reduce latency in instruction and data retrieval relative to retrieval of the instruction or data from main memory or similar storage in the system. The levels of the cache can include a first level (L1), second level (L2), and similar levels. A cache line is the unit of data transfer between the cache and main memory. The cache line size depends on the processor architecture. 64 bytes is a common cache line size in the current generation processor architecture, but other cache line sizes (32,128) are also utilized.

Different processor cores from the sockets, even multiple cores in single processor systems, may access the same cache line of memory. Since each processor core may have private caches, e.g., L1, L2 as mentioned above, the requirement to keep these caches in synchronization so that they are not working on invalid data, exists. Cache coherence protocols are utilized to keep the data in synchronization between processor cores, i.e., the cache coherence protocols ensure that all of the caches across all of the processors accessing the same cache lines are updated correctly. There are a variety of cache coherency protocols. Two classes of cache coherency protocols include snoop based and directory based cache coherency protocols.

Snoop based cache coherency protocols operate where each cache or processor core monitors topologies such as busses, mesh and/or torus, for changes in the data that each hold. Directory based cache coherency protocols operate where a centralized system keeps track of changes, and each processor core requests permission from the directory for making changes. In a hardware-based system, a snooping-based cache coherency protocol is often implemented, i.e., sometimes with the assistance of a directory-based system.

In some multi-processor systems, each processor has its own random access memory (RAM), although this can be accessed from other processors in the system connected by a fast interconnect e.g., a QuickPath interconnect (QPI)/UltraPath interconnect (UPI) based interconnect. However, the latency for accessing the memory of one processor from another CPU is higher than accessing a local memory. This is referred to as Non-Uniform Memory Access (NUMA). NUMA aware software processing systems try to limit the use of RAM from other systems. In other multi-processor systems, a uniform memory access architecture (UMA) can be utilized where all processors in the system shared access to all available memory over a shared bus.

Existing cache coherency solutions can involve excess broadcasting of data across processor cores and across sockets. As a single operating system manages the whole system, process and kernel data structures may be spread across processor cores. Cache coherency messages are sent to all the processor cores.

One of the problems with running applications across multiple processor sockets is dealing with NUMA. Big data applications and Virtual Network Functions (VNFs) which required a lot of processing have adapted to deal with NUMA, using local data and minimal communications. However, these applications are still affected by cache coherency penalties and are not able to scale beyond a few processor sockets. With the explosion of data and data being spread around, the ability to run a single logical server, comprising processing units and memory across many boards of one or more data centers, using local data and some minimal state sharing across processor cores presents many new opportunities. Reducing resource stranding being a first order possibility. It will also bring the vision of a "data center (DC) as a single computer" closer.

FIG. 1 is a diagram of one embodiment of a disaggregated data center. Traditional data center architecture consists of racks of server blades that are networked together. Each server blade is self-contained with resources such as processors, memory, storage, and I/O peripherals. Since the resources that make up server blades are within the physical confinement of a 'box,' replacing or augmenting any of the components in case of failure can cause other resources in the server to also be out of use for a period of time. This induces inflexibility in large scale data centers with respect to the maintenance and upgrade of resources. Another issue with traditional server blades is the static nature of the composition of the server blades. Once deployed, the server blades cannot be automatically recomposed (i.e., have the components changed) with different quantities of resources to suit different workloads in a data center.

Disaggregated data center architecture separates the resources that make up the physical server and places them within discrete pools such as a pool of processors (e.g., CPUs), memories, storage nodes as well as network interface cards (NICs) connecting them through a very fast interconnect e.g., highspeed optical links. Distinct and preconfigured servers are not needed in data center architectures where disaggregated resources can be managed. Instead, micro servers, also referred to as logical servers, can be created dynamically and on-demand by combining a subset of resources from available pools of hardware in the data center.

In a partially or completely disaggregation scenario different resources in a data center can be organized in independent resource pools and these pools can be interconnected via a fast interconnect. In this case, one can configure a logical server per application, which can result in scenarios where each processor core executes a single application when it is assigned to a logical server. By doing so, the contention among different applications for available resources on the processor core will be eliminated.

In the illustrated example disaggregated architecture, a data center can be organized such that server blades, server racks, or similar groupings of architecture are organized by resource type and interconnected such that any combination of these resource types can be utilized to form a logical server or similar group of resources to execute a set of applications. The set of resource can include a NIC pool 103, processor pool 105, storage pool 107, memory pool 109, and similar groupings of resources. Each of these groupings of resources can be managed or connected with an interface referred to as a top of rack switch (ToR) 115, which provide a connection to a fast interconnect 101 that connects each of these resource pools to one another. The ToR 115 can be any type of networking switch or similar hardware that enables all of the resources in a physical rack or similar physical grouping of resources to interconnect with the fast interconnect 101. The fast interconnect 101 is a communication medium (e.g., fiber optic) and set of protocols that enable communication between groups of pooled resources (e.g., processing pools and memory pools).

In the example disaggregated architecture, the ToR switch 115 associated with the compute pool 105 is directly connected to every processor core (e.g., via an on-chip network interface or an interface that could make it possible to address individual physical/logical core(s)). Upon receiving instruction or data traffic associated with a given application, the ToR delivers the traffic to the responsible processor core associated with the application.

Figure 2:
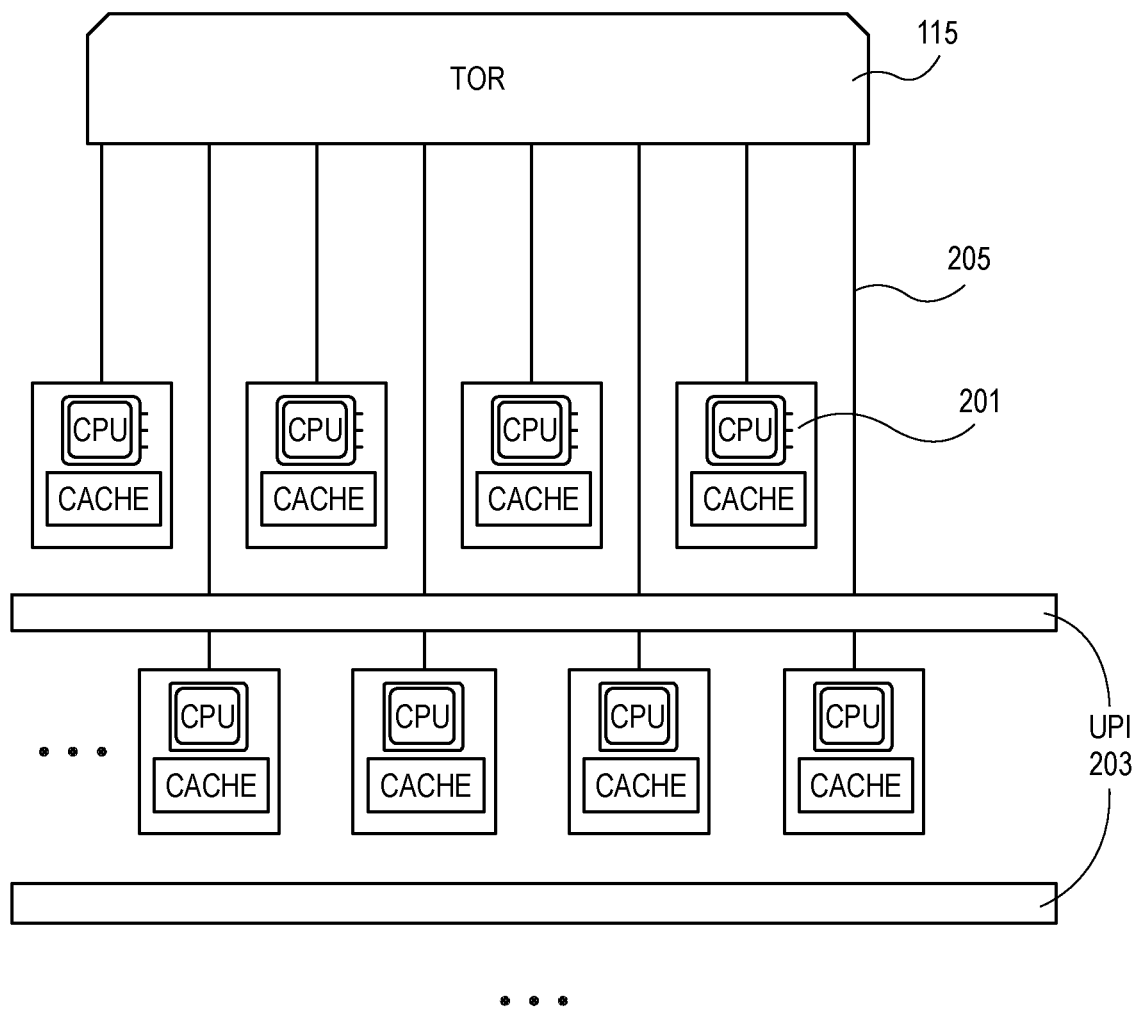
FIG. 2 is a diagram of one embodiment of an example processor pool in a disaggregated architecture including a rack of processor resources interconnected by a top of rack (ToR) switch.

FIG. 2 is a diagram of one embodiment of a processing pool associated with a ToR switch. In this example, the ToR switch 115 is directly connected to each processor 201 (e.g., CPUs). The processors 201 can receive traffic directly via an integrated NIC embedded in the processor die or directly from ToR via the PCIe protocol 205, or via similar mechanisms. Examples of ToRs can include an optical switch (e.g., a fast lane for expedited execution at 10 Terabits (FLEET) optical switch) that can be integrated with PCIe communication channels allowing fine-grained data transfers from switch to processor cores/servers. Each of the processors 201 can also be connected directly or indirectly with an interconnect 203 that enables communication between the processors 201, the ToR 115, and/or the fast interconnect of the data center between the resource pools.

Figure 3:
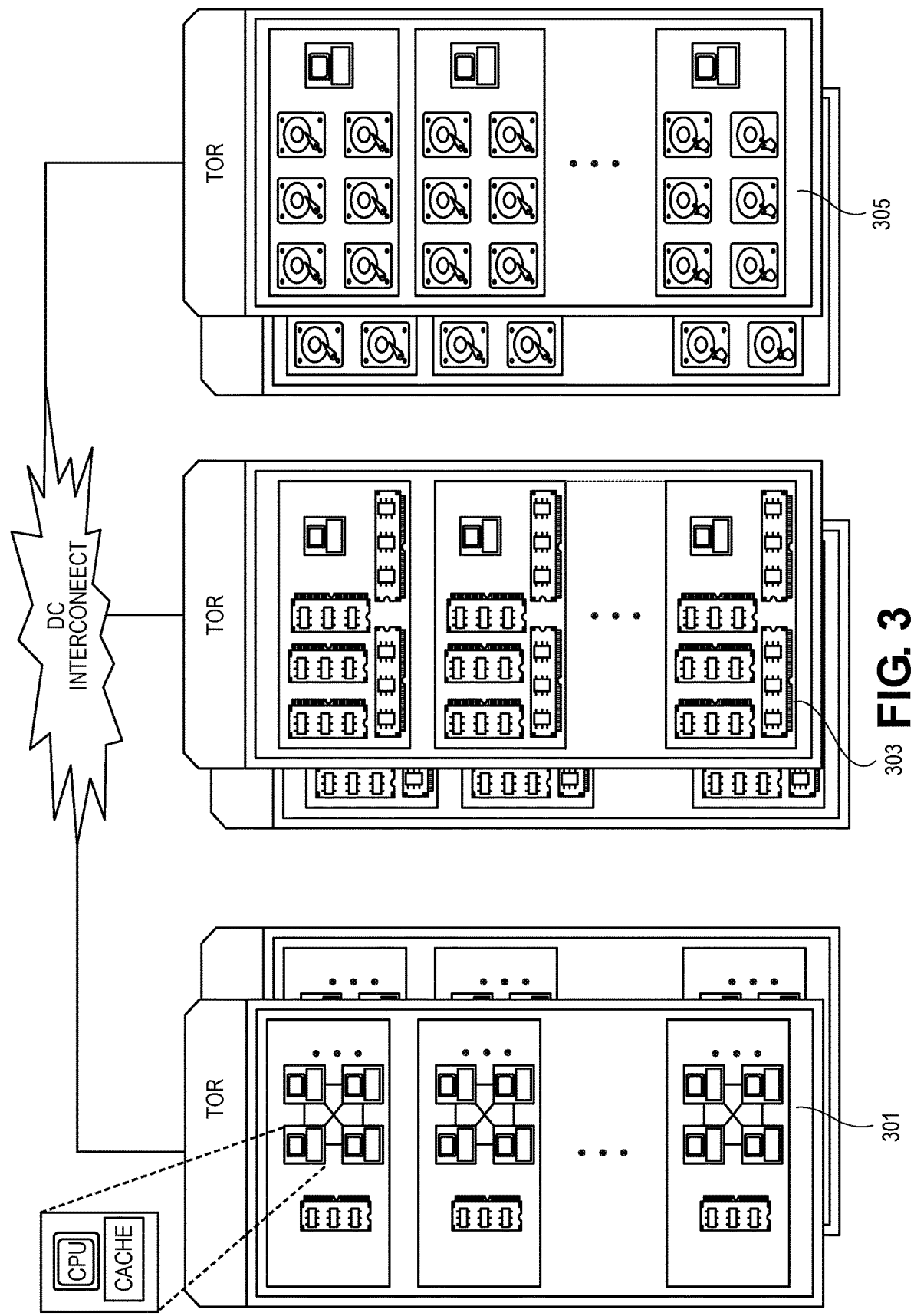
FIG. 3 is a diagram of one embodiment of a set of interconnected server racks.

FIG. 3 is a diagram of one embodiment of another disaggregated data center configuration. Different levels and types of resource disaggregation can be utilized in a data center. In some embodiments, resource disaggregated data centers are composed of servers, each with a heterogeneous set of resources, interconnected through high-bandwidth and low-latency networks. In this example data center, compute pools can be realized with racks composed of blades 301-305 where some blades 301 have more processors, and some other blades 303 are filled with more memory and other resources. Any combination and permutation of resources can be supported in each of the blades and correlated racks. Compute express link (CXL) and Gen-Z technologies, PCIe, and/or ethernet can be used in the blades to facilitate interconnections, for example in the memory blades. The blades 305 are an example of blades that are primarily composed of storage resources, e.g., solid state drives (SSDs), optical drives, magnetic drives, and similar storage technologies.

In this example, the ToR switch associated with each compute pool is directly connected to every compute server via servers NICs. Upon receiving data or instruction traffic, each ToR delivers the traffic to the responsible logical servers in which the recipient logical server delivers the data to the designated process for that traffic (e.g., for an application assigned to a given logical server).

In some embodiments, data centers, blades, or racks can utilize server-grade processors. Server-grade processors can include a feature, referred to as a processor interconnect, that enables them to communicate with other processors (e.g., inter-CPU communication). Consequently, servers often contain multiple processors, which are also known as multi-socket servers. Processors are manufactured with increasing number of cores (i.e., 64, 128, or more cores). Additionally, in some embodiments processor pools in disaggregated architectures can be built based on the same functionality so that applications could freely use the compute resources (i.e., CPU cores) within a compute pool. Intel x86 processors use a point-to-point processor interconnect called QuickPath Interconnect (QPI), or UltraPath Interconnect (UPI). UPI improves on scalability problems associated with QPI. UPI is a directory-based home snoop coherency protocol and is capable of transferring up to 10.4 GT/s. The QPI/UPI counterpart in AMD processors is called HyperTransport (HT). Some ARM processors use CCIX (Cache coherent Interconnect for Accelerators) protocol. Unlike other interconnects in the system (e.g., PCIe), the inter-processor interconnect allows complete and easier access to the memory of other processors (e.g., CPUs).

These and similar types of inter-processor interconnects provide high bandwidth and low latency processor interconnect performance for accessing data from neighboring processors. Accessing the memory of another connected processor on-chip memory (e.g., a cache) is generally faster than accessing the data from main memory. Moreover, in the disaggregated architecture, the latency to fetch the data from remote memory is much higher than accessing the data from a neighboring processor cache. A 'neighboring' processor, as used herein can be a processor on the same server blade, same rack, or same processor pool. As discussed further herein, the neighbor can also be a processor that is in a shared zone with the primary processor.

Resource disaggregation architectures utilize hardware interconnection protocols to enable the communication between the disaggregated components of the architecture. Any hardware interconnect technology or combination thereof can be utilized in the resource disaggregation architecture that enables coherent communication and use of the hardware resources by applications. Hardware interconnect technologies that are utilized can include Gen-Z, Compute eXpress Link (CXL), Open Coherent Accelerator Processor Interface (OpenCAPI), Cache Coherent Interconnect for Accelerators (CCIX), and similar protocols and technologies. Gen-Z is an open technology for memory semantic data access. CXL is a cache coherent protocol for processor-accelerator interface. OpenCAPI is an open interface that is agnostic to processor architecture, which allows any microprocessor to attach to coherent user-level accelerators, I/O devices, and advanced memories. CCIX enables multiple processor architectures to seamlessly share data, allowing two or more devices to share data in a cache coherent manner. These technologies, among others, enable sharing, monitoring, controlling, and managing the disaggregated resources.

To perform low latency, I/O data processing, I/O data is required to be available in the processor cache. This is enabled via cache technology such as Direct Cache Access (DCA). DCA makes it possible to send/receive I/O directly to/from the processor cache. DCA can be implemented as Data Direct I/O (DDIO) technology in Intel processors and as "cache stashing" in ARM processors. DCA implementation can use a limited portion of cache (e.g., Last Level Cache (LLC)) to guarantee cache resources for both I/O application and other applications in worst-case scenarios. For example, when an I/O intensive application dominates the LLC, it adversely affects the performance of other applications running on the same system by evicting their data from the LLC. The size of the portion used by DDIO can be configured in the current systems.

The cache is a limited resource and the portion of cache dedicated for I/O data is a fraction of available processor cache. Therefore, an application cannot utilize a cache capacity that is greater than the available cache embedded in a processor die where the application is executing. However, in processor pools, such as in a disaggregated architecture, not all processors have sufficient cache capacity to execute their applications optimally. At the same time other processors are executing applications that are compute-intensive applications, but which do not require, or which may not benefit from a great amount of processor cache memory making these caches underutilized. Therefore, at any given time, the available cache memory in a processor pool, a limited and valuable resource, may not be utilized efficiently or optimally.

In disaggregated data center architectures, resource pooling has been performed at a higher granular level, such as pooling compute resources, memory (e.g., Random Access Memory (RAM)), and/or storage. However, there is no mechanism to pool available processor cache resources within a processor pool. As a result, the processor cores are limited to the use of the cache integrated within the processor die. Processors that can benefit from additional cache resources beyond those available on the processor die cannot take advantage of available, unused, and/or underutilized cache on neighboring processors (i.e., cache of processors that are executing applications that are not sensitive to cache size and availability, e.g., compute intensive applications, or idle processors whose cache is not used).

The embodiments provide a mechanism for pooling cache resources across the processors in a processor pool. In some embodiments, the mechanism for pooling cache resources can utilize mechanisms for accessing and querying efficiently the subset of neighboring processor data. In some embodiments, mechanisms such as those described in International Patent Application No. PCT/SE2019/050601, filed Jun. 20, 2019, can be utilized to enable optimized cache updates. The fine-grained positioning of I/O data can be combined with the embodiments for the flexible use of neighbor processor cache.

Similarly, in some embodiments, a mechanism for fine-grained placement of incoming data into cache can be utilized. If a neighbor processor traffic is allowed to enter through another processor, it could potentially affect the applications cache or the amount of cache available for data coming to that processor. A mechanism to enable fine fine-grained positioning of I/O data within the processor cache such as that described in International Patent Application No. IN202111026414 filed 2021 Jun. 14, can be utilized.

Additionally, as processor pools may not have a large amount of memory or any types of RAMs, they need to fetch some data from the remote memory requiring longer latency, which makes the low utilization of local/neighbor caches an important problem for disaggregated servers. The embodiments provide a method to efficiently track, isolate, and allocate the available processor caches across the same processor pool, whether the cache belongs to the same physical server or a remote server, to improve the performance of application running on a local socket.

The embodiments provide a method that enables pooling of processor cache resources and a method to efficiently utilize the unused/available cache memory in disaggregated architectures. The embodiments can provide a definition for a pool of processor caches that can be shared among different processor cores on-demand. The embodiments track the cache usage characteristics for a given processor 'zone' within a processor pool. The embodiments identify the available caches suitable for remote use, isolate the identified locations, and facilitate the usage of the isolated caches for other processors by enabling the distribution of traffic among the processors that their caches are logically unified in order to perform more efficient I/O transfers. The embodiment can be used to reserve part of static random access memory (SRAM)/dynamic RAM (DRAM)/high bandwidth memory (HBM), or similar types of memory attached directly to specific processors enabled by technologies such as 3D silicon stacking.

The embodiments provide a system and method for handling and sharing cache resources between processor cores in a processor pool containing at least two processors in which one processor is assigned an application that receives data in a cache (e.g., L1, L2, or LLC). The method obtains information regarding a given application executing on a given processor that needs to receive data in the cache. The method identifies zones from available processors in the pool processor pool. The method configures the processors in the same zone to support the cache pooling (e.g., configuring cache monitoring, cache visibility (e.g., snooping gateway (GW)), and similar configuration)). The method obtains the status of the cache for a given application or for each application. The method determines when the cache is not suitable for an application (e.g., there is currently insufficient cache space, a prediction of insufficient space, or similar sub-optimal usage of the cache). The method obtains the status of alternative caches from the processors belonging to the same zone as a processor assigned to a given application. The method selects an alternative processor from the zone where the alternative processor cache can be shared with other processors in the zone.

The method further decides on a distribution rate and a time frame to send data and/or instruction traffic to both a primary processor cache and a secondary processor cache. The method performs relevant configuration on alternative processors to support the distribution of traffic (e.g., locking and isolating a portion of the cache from the alternative processor for use of a given application). The method can decide to send some portion of the traffic to main memory if an alternative cache cannot be found. The method can perform relevant configuration on the ToR switch to direct the traffic to different processors/caches/memory with a decided distribution factor. In some embodiments, the method can add hints that are embedded in traffic so that the alternative processor can distinguish that it is accommodating data for another processor.

The embodiments provide a number of advantages over the art. The embodiments provide a method and system to enable cache pooling in a disaggregated architecture. The embodiments enable an application to utilize the unused/available cache on remote processors within a server, a compute pool, zone, or a rack. The embodiments improve resource utilization in disaggregated architectures, multi-processor systems, and similar systems while providing performance improvements for cache-sensitive and I/O intensive applications. The method and system enable applications to store their data in unused/close/fast cache memory as opposed to far/slow remote memory, thereby saving multiple round trip times (RTTs) in handling of instruction and data traffic.

In some embodiments, a cloud manager or a data center resource scheduler is provided with a system and methods to benefit from the available in-network computation capabilities to utilize the cache pool resources more efficiently.

The embodiments provide a substantial improvement in efficiency for applications having a skewed and cache sensitive workload, as they would benefit from storing frequently accessed or utilized data in the close and fast memory (i.e., neighbor processor caches) when the cache of the primary processor is insufficient. Moreover, applications with multiple instances within a datacenter could use the cache pooling system of the embodiments to perform better data sharding/partitioning (i.e., the instances can get access to a new memory tier with a lower latency access time). The embodiments are applicable for a data center with a disaggregated architecture, a set of servers with multi socket processors, in scenarios where SRAM/DRAM/HBM are attached directly to specific processors enabled by technologies such as 3D silicon stacking, and under similar circumstances. The embodiments can be implemented as part of a control plane or data plane depending on the system data usage, configuration, and requirements.

Figure 4:
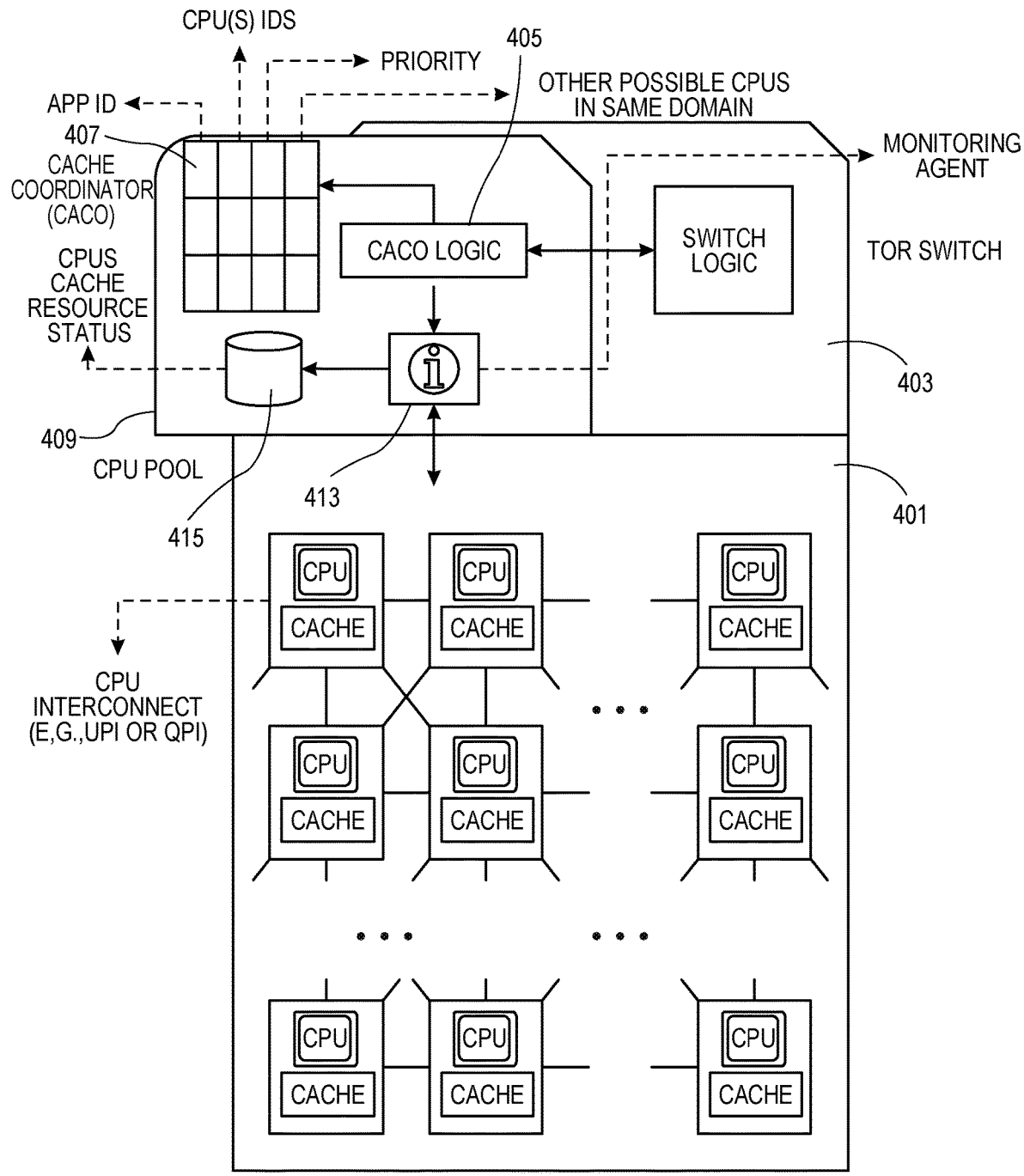
FIG. 4 is a diagram of one embodiment of a server rack with a cache coordinator in a top of rack switch.

FIG. 4 is a diagram of one embodiment of a processor pool, ToR switch, and cache coordinator implementing the method of cache pooling. The embodiments provide an entity referred to herein as a CAche COordinator (CACO) 409 that can be implemented independently, as part of the Top of the Rack (ToR) switch 403 in disaggregated architectures, or as part of NIC in traditional multi-socket (multi-processor) servers. The embodiment of the disaggregated architecture is provided by way of example rather than limitation. One skilled in the art would understand that the CACO 409 or similar structure can also be implemented in the NIC of the multi-socket/processor server, or similar systems and architectures. The disaggregated architecture includes a processor pool 401. In this example, each processor in the pool 401 is a CPU with its own cache, which can include any configuration of L1, L2, LLC or similar cache. Each CPU can have a set of cores. The cores can have separate or share caches.

The ToR switch 403 is directly connected to each processor in the processor pool 401. The ToR switch 403 can be managed by switch logic and include the CACO 409. The CACO 409 can include a cache coordinator table 407, logic 405, interface 413, storage 415, and similar components. The cache coordinator table 407 can include entries that track association of applications with processors with fields including an application identifier (ID), processor (e.g., CPU) identifier, priority, list of neighboring or alternate processors and similar information. The interface 413 can manage communication directly with each of the processors in the processing pool 401. The connections between the interface 413 and the processors can be a PCIe connections or similar connection. The storage 415 can be a cache or similar storage device that tracks processors' cache resource status and similar information. In some embodiments the cache coordinator table 407 can be stored or backed up in the storage 415.

In some embodiments, the CACO 409 can be implemented as a demon of the ToR 403 or as an independent demon that closely collaborates with the ToR 403. It is possible to implement CACO as part of control plane (e.g., an OpenFlow controller or any other control-plane entity) where CACO passively decides to (re)configure the switch (i.e., the ToR 403) to perform different actions. Additionally, the CACO 409 can be part of data plane where it acts on a per-packet basis. In the latter case, the CACO 409 is part of ToR 403 switching logic. CACO includes (i) CACO logic 405, (ii) a cache coordinator table 407 that stores required information regarding the recipient application and the logical processor executing that application, (iii) a monitoring demon that can be part of the interface 413 or separately implemented, and (iv) a database in a storage 415 that contains information regarding the status of each processor in the processing pool and their caches in the pool.

The CACO logic 405 can be a demon or similar process executed by the ToR 403. The CACO logic 405 interacts with ToR 403 switch logic and the demon responsible for configuring the resources from available processors in the processor pool 401 for a given application. The CACO logic 405 is responsible for many of the operations done by CACO 409, such as deciding whether cache from other processors in the pool 401 should be annexed/shared to/with a processor that is executing a given application. The CACO logic 405 also configures the relevant entities (e.g., ToR switch logic) to enable annexing/sharing the additional cache from other processors to the given processors. The CACO logic 405 informs the switch logic where and with what distribution ratio the data and instruction traffic should be directed to different processors for a given application.

A monitoring demon or similar process monitors/obtains information regarding each processor's cache status (i.e., pollution, occupancy, and eviction rate) available in the rack/pool/server. The monitoring can be done at an interface 413 via performance counters available in each processor via state-of-the-art communication/monitoring protocol for disaggregation, or via other available performance counters in servers with multi-sockets. The monitoring can be on-demand, i.e., based on the request from CACO logic 405, or can be done periodically. In the latter case, the status of each processor available in the pool or rack can be stored in a cache resource database (e.g., in storage 415). In some embodiments, the processors are configured to provide information to the monitoring demon periodically or when their statuses are changed over some pre-defined threshold. In other embodiments, the monitoring demon polls or similarly queries the processors periodically for status. Any monitoring process can be utilized.

The cache coordinator table 407 contains the information that CACO logic 405 requires to perform its operation. This table 407 can be filled when the application is provisioned by a cloud manager or any other entity that is responsible for provisioning the resources for a given application. Later, the information in this table can be maintained and updated by the CACO logic 405. This table 407 includes an application identifier (APP ID), which can be a local or globally unique identifier for an application assigned to a processor by the cloud manager or similar orchestrator. The cache coordinator table 407 also includes a CPU or processor ID field, which indicates the processors in the processor pool 401 executing a given application identified by the (APP ID) to which the data or instruction traffic for that given application will be directed.

The cache coordinator table 407 can also include a priority field that indicates the priority of the application, when multiple applications are executing on the same processing pool. This priority value can have any range or granularity (e.g., a priority range of 0 to 10). Higher priority applications can be given preference for cache resources. The priority can be determined at initialization by the cloud manager, orchestrator, or similar entity that assigns the application to a processor. The cache coordinator table 407 can also include a column for other or alternative processors. The alternative processor field can provide a list of the available processors in the processing pool, whose resources can be shared with and used by the processor that is executing the application. Populating this list minimizes the cost of monitoring, which means if needed the CACO 409 only monitors/queries a subset of processors that are available in the pool 401. Having a subset of available processors defined in the processor pool that can share their cache resources for any given processor addresses the scalability problem. It also enables cloud manager to temporarily enable additional unused proximal processor cores to the pools 401 of prioritized applications so that the unused processor cache can be used until the time they are used elsewhere. This list can be determined by the cloud manager, orchestrator, CACO logic 405 or similar entity using any process, algorithm, criteria, or other mechanism for selection. Each of the fields can be initially set by the cloud manager, orchestrator, or similar entity that initialized the application, assigned the application to a processor in the processor pool 401. In some embodiments, the entries for the application can define the application as a high-priority application, traffic of which is required or preferred to be available at the cache.

Figure 5:
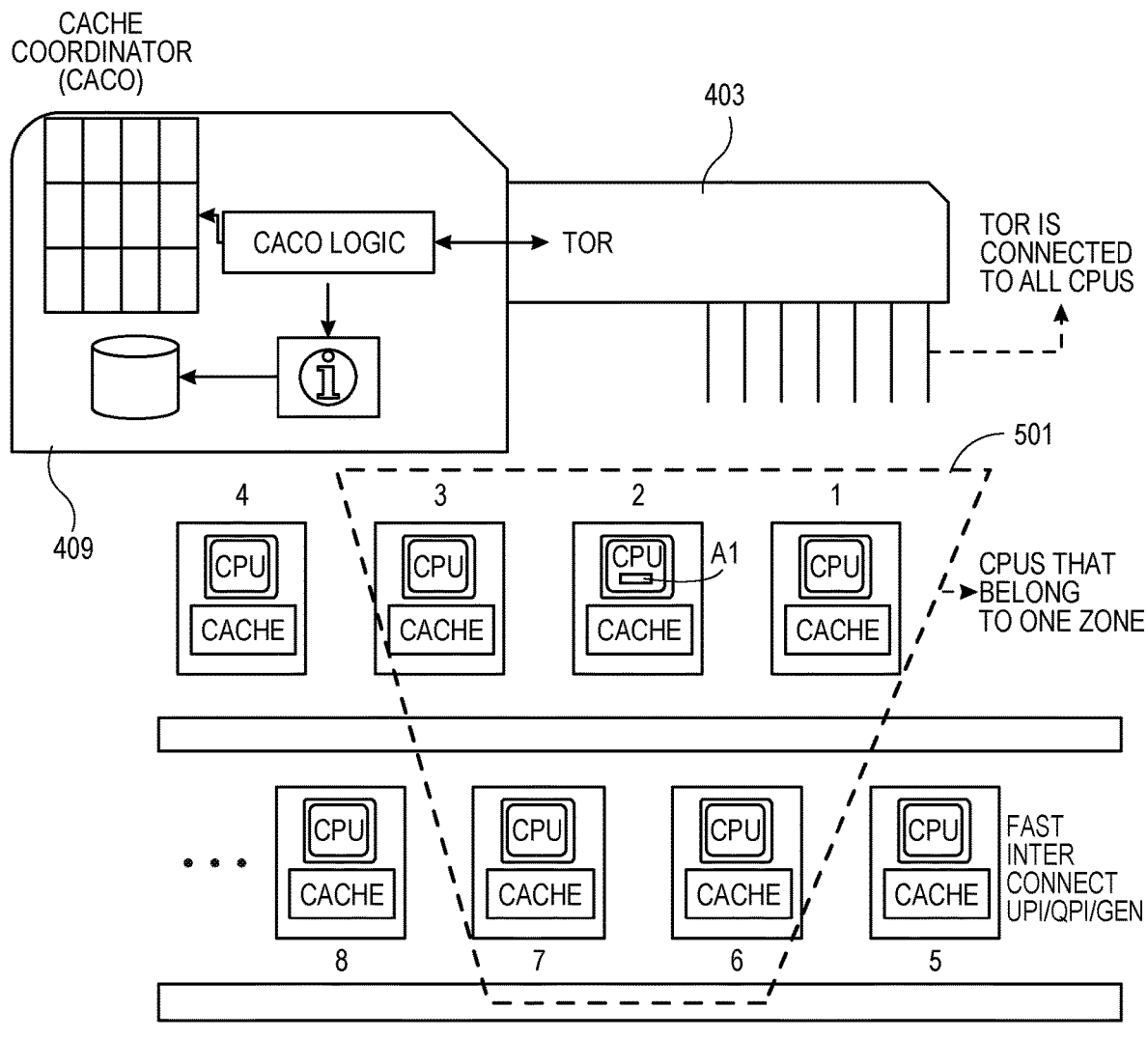
FIG. 5 is a diagram of one embodiment of a set of processors that are grouped as a zone to pool cache resources.

FIG. 5 is a diagram of one example embodiment of an operation of a CACO. The CACO operations are discussed by way of an example where there is an application that requires fast access to I/O data, i.e., it requires the I/O data to be available in the cache. The requirement can be configured at the initialization phase by the application/user, which is conveyed to the CACO by the cloud manager, orchestrator, or similar entity that assigns the application to a processor. The ToR switch is capable of distinguishing traffic belonging to different applications running on different processors and in some cases different cores of the processors. The ToR switch is also able to perform some advanced operations on the traffic. If the ToR switch is not able to perform any of these tasks then, the CACO 409 can take over and perform some of the tasks assumed to be performed by the switch.

In an example initialization phase, illustrated in FIG. 5, an application A1 is about to be scheduled in a data center. In this case, the relevant entity (e.g., DC resource scheduler or cloud manager) decides to execute the application A1 on a processor 2 or more specifically core C2 of processor 2). Based on the application type and/or the user request, the cloud manager set the priority of A1 to P1 in the cache coordinator table of the CACO 409. Then, the relevant entity (e.g., DC resource scheduler) configures the ToR to direct the traffic for application A1 to processor 2 core C2 and also configures the CACO 409 and the cache coordinator table with relevant information.

Figure 6:
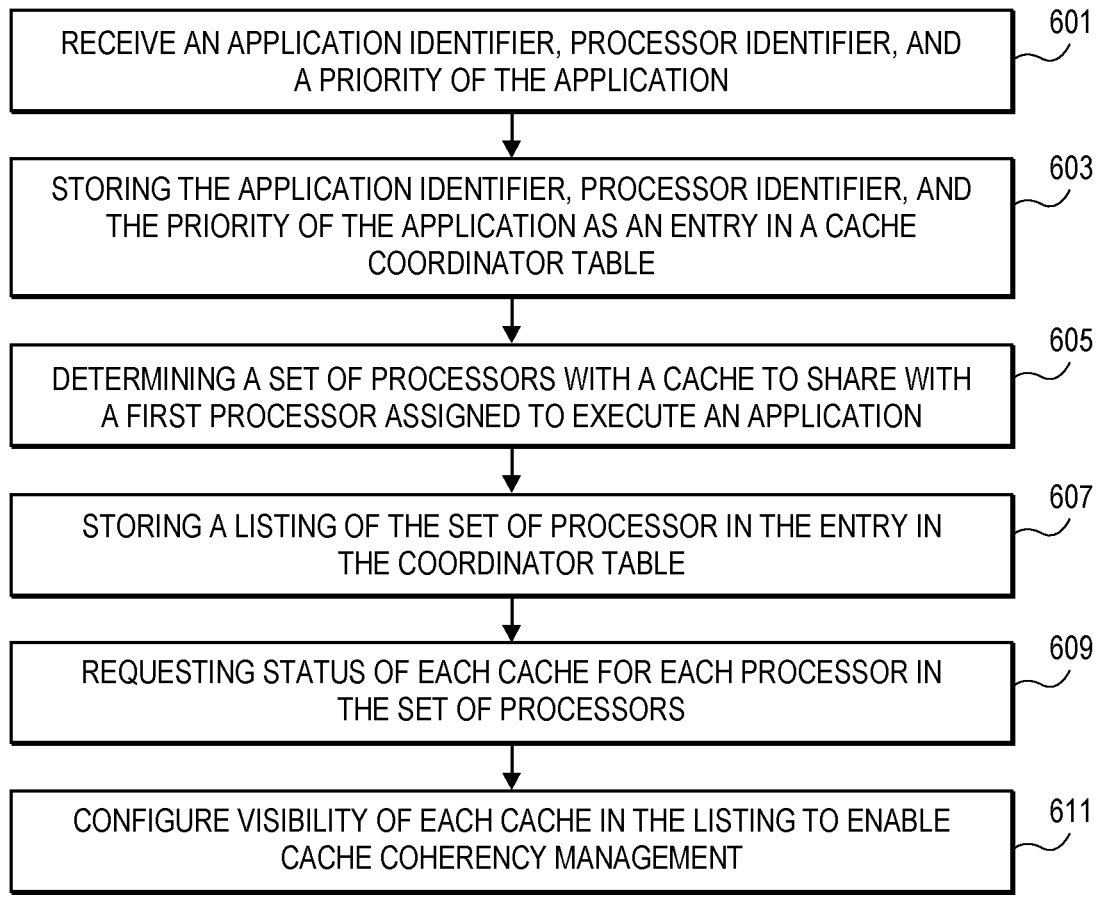
FIG. 6 is a diagram of one embodiment of a multi-socket server implementing cache pooling.

FIG. 6 is a flowchart of one example embodiment of the initialization process as performed by the CACO. The example of FIG. 5 is described in conjunction with the initialization process shown in FIG. 6. Thus, the process can begin by the CACO 409 receiving the application identifier, processor identifier, and a priority of the application from the assigning entity (Block 601). This information is then stored in the cache coordinator table as an entry for the application that has been assigned to the processor/core (Block 603).

Based on the information provided, the CACO can identify the list of processors of which the processor cache can be shared with the application A1 and the assigned processor 2 and core C2 (Block 605). The determined list of alternate processors can then be stored in the cache coordinator table (Block 607). In the example, the CACO 409 determines that the assigned processor 2 and core C2 can benefit from using caches of processors 1, 3, 6, and 7. Any process or mechanism using any metrics or criteria can be employed to identify alternate processors or 'zones,' examples of which are further discussed herein. In addition, the CACO 409 can initiate relevant configuration on the processor that belong to the same zone (e.g., to have the processors send updates regarding their status) (Block 609). Additionally, the CACO 409 can configure the visibility of each cache in the zone to other processors in the zone using a snooping GW or similar mechanism. At the completion of the initialization phase the cache coordinator table at the CACO 409 would look as follows:

TABLE 1

CACO table entries for a sample application (A1).

| APP ID | CPU ID | Priority | Other Processors |
|--------|--------|----------|------------------|
| A1     | 2 (C2) | P1       | 1, 3, 6, 7       |

Figure 7:
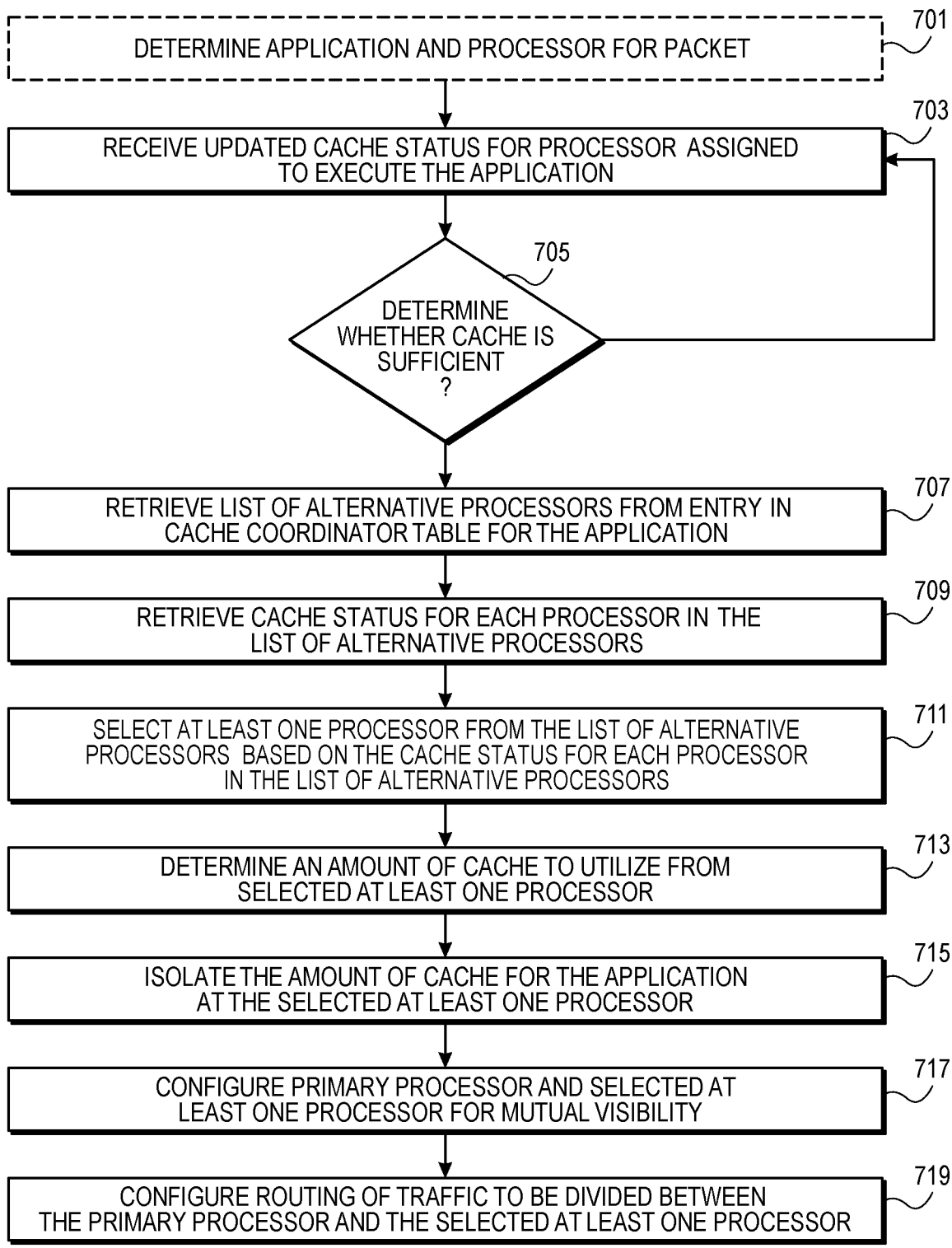
FIG. 7 is a flowchart of one embodiment of a process of a cache coordinator (CACO) during application initialization.

At the completion of the initialization, in this example, the application A1 is being executed on processor 2 core C2 and the ToR is configured to direct the traffic for application A1 to 2 (C2) and the CACO 409 starts its operation to monitor and manage the cache utilization for A1. The CACO 409 can be implemented as part of control plane or as part of a data plane. FIG. 7 is a flowchart of the operation of the CACO to manage cache pooling and utilization that is generalized to include both the control plane implementation and the data plane implementation. Each implementation is discussed by way of example and not limitation. The relevant actions of each implementation are referenced to the generalized flowchart of FIG. 7.

Control Plane Implementation of CACO

After the initialization phase, the CACO monitoring logic starts obtaining information regarding the performance of the processor and/or core that is executing the assigned application such as cache pollution, occupancy, and eviction rate and provides this information to CACO logic (Block 703). In the example, the application A1 is a high priority application. Any type of active or passive monitoring can be utilized to collect this cache status information. In the example, the CACO obtains information regarding the cache status for processor 2 and core C2, such as cache I/O misses and cache occupancy.

Based on the collected information, the CACO determines whether the cache status is suitable for the application (e.g., it is not experiencing congestion, a combination of metrics that can be used to determine whether there is sufficient cache space for the application) (Block 705). If there is sufficient cache space at the assigned processor (Block 705), then the CACO will not perform any additional operations and will periodically update the cache status information (Block 703) and reassess (Block 705). Therefore, the ToR switch continues to direct the data to the processor executing the application.

In the example, the cache of processor 1 core C2 experiences continued congestion. If the cache status is not suitable (i.e., it is experiencing congestion based on any combination of metrics), the CACO logic queries the coordinated cache table to find possible alternative processors in which their cache can be shared and attached to the assigned processor for the application (Block 707). This information can be retrieved as lookup based on the application identifier or similar query of the coordinated cache table. In the example, based on information stored in the cache coordinator table, processors 1, 3, 6, and 7 are the candidates to share their cache resources with processor 2 and/or core C2.

The monitoring demon or similar aspect of the CACO obtains the alternative processor cache status or part of the alternative processor cache status and provides that information to CACO logic (Block 709). As mentioned earlier, different approaches can be employed to obtain such information. In the example, cache status for processors 1, 3, 6, and 7 can be collected and provided to the CACO logic. Upon receiving the cache status information, the CACO chooses an alternative processor and/or cache from the processors with some spare cache storage capacity that can be allotted to the application (Block 711). The CACO logic also decides how much of the alternative processor cache should be attached to the primary processor cache (Block 713). The CACO logic can utilize different algorithms for selecting/choosing the location and size of the alternative cache. For instance, the CACO logic can give more priority to the physical distance to the available caches, it can consider other metrics such as bandwidth, the number of running applications on the remote processor, the relative priorities of applications on the different processors and other factors. In the example, the CACO decides to annex 50% of the cache from processor 3 to be utilized by processor 2 and core C2.

After identifying the alternative processor cache for application, the CACO 409 isolates the required space for the I/O data for the given application (Block 715). Any cache isolation techniques can be utilized to perform this operation that other applications can not interfere with this optimized I/O transfer process. In the example, a 50% cache capacity of processor 3 will be locked, isolated, and dedicated to application A1, thereby making it inaccessible to other applications that are executing at processor 3 and causing it to function as an extension of the caching of application A1 and processor 2.

The CACO 409 performs a configuration of the primary processor that provides mutual visibility between processor 2 and processor 3 with relation to cache operation (i.e., establishing a snooping gateway to have a proper processor list in the cache snooping domain) (Block 717). In the example, the CACO 409 configures the snooping gateway, adding the processor 3 in the same snooping domain as processor 2 core C2. By doing so, the snooping messages from processor 2 core C2 will reach processor 3 when the snooping is triggered.

To efficiently utilize both the local and remote cache that is available to the application A1, the traffic destined for application A1 can be directed to different processor caches (i.e., processor 2 and processor 3 caches) proportionate to their capacity assigned for the given application. The CACO 409 configures the ToR switch on how to handle the distributing of traffic among the two or more processor caches (Block 719). The distribution can be applied in a time bounded matter. For example, the CACO 409 can establish 2 MB traffic on processor 2 and 1 MB on processor 3, over a given time period. If the cache usage for the application (e.g., A1) still exceeds the given allotment, then the CACO 409 can attempt to allot further cache from additional processors, or where there is no available cache space, the CACO 409 can map the data directly to main memory bypassing cache to avoid congestion. The CACO 409 also informs/configures the ToR switch to perform proper action to route the traffic that will be forwarded to the alternative cores as they are assigned. In the example, the ToR switch will be re-configured so that two-thirds of traffic is directed to processor 2, and one-third of traffic is redirected to processor 3.

At this point, the traffic for application A1 will be distributed among the cache of processor 2 and the dedicated portion from the cache of processor 3. In this case, when the primary processor (i.e., processor 2) needs to access the data and it is not in its local cache, queries are automatically sent to the cache of processor 3 to see if it has a copy. If the data is available at the cache of processor 3, it will be accessible via processor interconnect. In cases where additional processor caches are made available, each of these caches can be similarly checked and where the available cache is insufficient amongst all of the alternative processors then the data can be retrieved form a designated area of the main memory.

The process is similar where the CACO has been implemented in the data plane. In this case, CACO will be integrated part of ToR switch and stays in data plane. The process is described also in relation to FIGS. 5 and 7.

The process can be initiated where the ToR switch receives I/O traffic (e.g., a packet) destined for an application (e.g., A1) and the traffic will be passed to CACO for distribution. The received packet is identified (i.e., based on information stored in coordinated cache table) as a designated priority, which can mean the designated application desires to receive all of its traffic into the destination processor cache (Block 701). In the example, the received packet includes information indicating that the traffic belongs to application A1. The location (i.e., the destined processor) to which traffic should be sent is determined/identified. In the example, it is determined that the application A1 traffic is destined for assigned processor 2.

The CACO logic requests/obtains the status of destined processor from monitoring demon that provides information to the destined processor's cache status (i.e., pollution, occupancy, and eviction rate of the destined processor) (Block 703). In the example, the status of processor 2 is obtained. If the recipient cache status is suitable for the application (i.e., it is not experiencing congestion or similar limits) (Block 705), then the CACO will not perform any additional operations until the cache status indicates that the cache is insufficient for the application. Therefore, the ToR switch will send the I/O data to the given processor that is responsible for the I/O data processing. In the example, this information can indicate that the cache of processor 2 is congested, therefore, additional actions are triggered to look for additional cache space.

If the cache status is not suitable (i.e., it is experiencing congestion or is otherwise insufficient), then the CACO logic queries the CACO table to find possible alternative processors in which their cache can be attached to the destined processor (Block 707). As mentioned earlier, to address the scalability issue, the coordinated cache table includes a subset of available processors in the processor pool that can share their cache resources for any given processor in the pool. By doing so, cache pooling process addresses the scalability problem. In the example, based on information stored in the coordinated cache table, processors 1, 3, 6, and 7 are the candidates to share their cache resource with processor 2.

The CACO 409 requests the status of each of the possible alternative processors from the monitoring demon (Block 709). In other embodiments, the monitoring demon could also send the latest status periodically to CACO 409. In our example, cache status for processor 1, 3, 6, and 7 will be provided to CACO logic. The CACO 409 chooses an alternative cache from the processors which have some spare cache storage capacity that can be allotted to the application (Block 711). The CACO 409 can utilize any algorithm for selecting/choosing the alternative cache. For instance, it could give more priority to the physical distance, or it could consider other metrics such as bandwidth, the number of running applications on the remote processor, or similar factors. Additionally, it could consider the amount of traffic received by the application (Block 713). In the example, the CACO 409 decides to annex 50% of cache from processor 3 for processor 2.

After identifying the alternative processor cache for the application A1, the CACO isolates the required space for the I/O data for the application to mitigate any possible contention in the alternative processor cache (Block 715). This step ensures that other applications do not interfere with the efficient I/O transfer process. In the example, 50% cache capacity of processor 3 will be isolated and dedicated to application A1.

To fairly utilize both local and remote cache, the traffic can be directed to different processors, proportionate to the capacity dedicated for a given application on each processor socket (Block 717). The process can embed a hint in data forwarded to alternative processor, so the alternative processor can handle the forwarded data properly. The ToR switch/CACO in the example, sends two-thirds of traffic be directed to processor 2, and one-third of traffic will be redirected to processor 3.

When the I/O data is being transferred to an alternative processor's cache, the application accesses the I/O data via UPI/QPI or their counterparts for disaggregated processor pools (or any other processor interconnect or point-to-point protocol) (Block 719). In this case, when the primary processor needs to access the data and it cannot find it in its cache then it queries other processors in the alternate list, zone, or pool to see if they have a copy. In the example, the data will be available on another processor cache and will be provided to the original processor. It is possible to notify the application about the potential locations (if the processor supports configurable snooping protocol) so that the snooping protocol could directly fetch the data from the designated remote processors.

In the example data plane implementation, the CACO 409 does not configure the system before receiving any packets. However, it is possible to extend this method to perform a pre-operational decision about the traffic after CACO has been configured with the application information.

Figure 8:
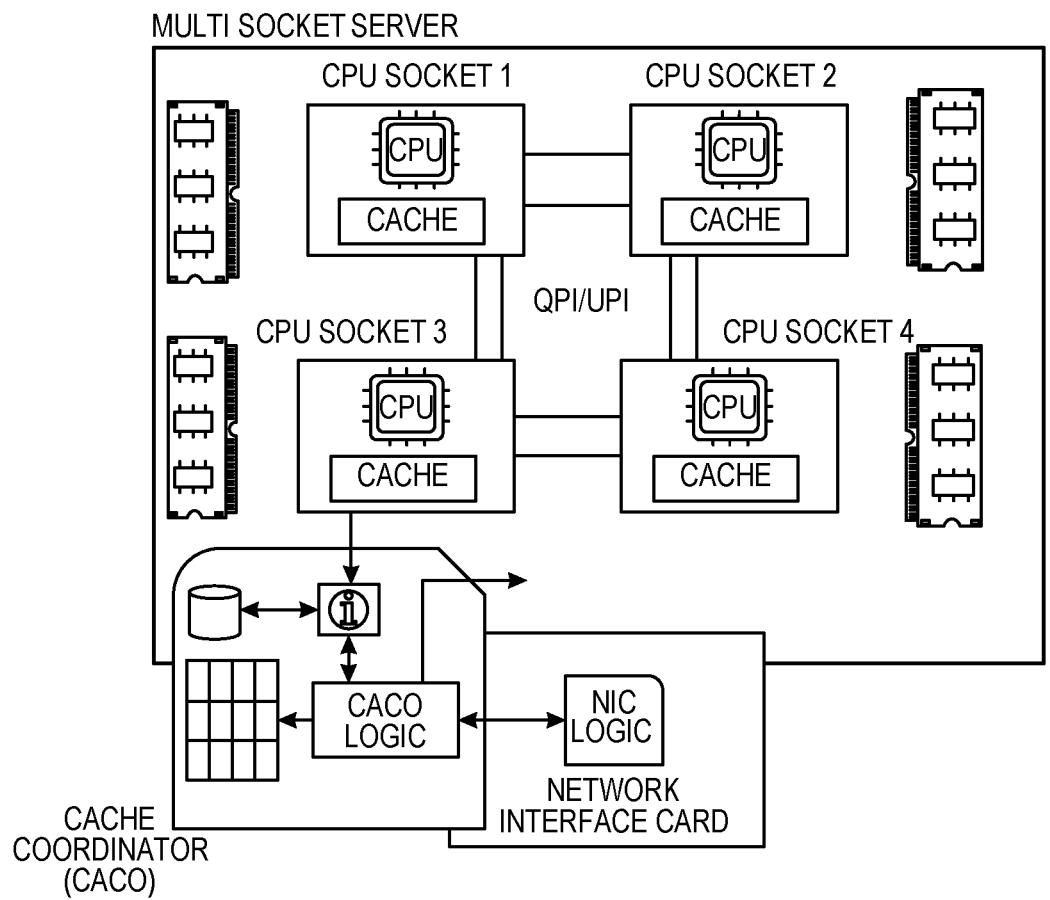
FIG. 8 is a flowchart of one embodiment of a process for cache coordinator operation to handle cache reallocation.

FIG. 8 is a diagram of one embodiment of a cache coordinator being implemented on a commodity server with NIC support. The embodiments are not limited to disaggregated architectures. The embodiments and the benefits of cache pooling can be realized in any given system (e.g., a commodity server) that is equipped with two or more processor sockets. The example of FIG. 8 shows a system with 4 CPU sockets.

In this case, the CACO could be implemented as an independent demon in a server, part of a NIC (as illustrated), or can be integrated with a PCIe controller. If an application that needs fast I/O transfer (i.e., it always prefers to receive the data in the cache) is running on socket 1 and the server has four processor sockets. The CACO can be configured to ensure that the I/O traffic destined to this application should always end up in cache. The different steps performed by CACO in this case include that the CACO monitors the status of the cache for all sockets, and if the cache in processor socket 1 is congested and the next packets are speculated to be evicted to main memory before getting processed, then the CACO (1) selects one (or more) alternative caches from neighbor processors if it is possible, (2) decides how traffic should be distributed among primary and secondary processors, (3) isolates the cache on the selected secondary processor, e.g., using isolation/monitoring capabilities for the cache, and (4) configures the NIC (or any device responsible for handling the I/O traffic and delivering it to different CPUs) to direct some of the arrival traffic to the selected processor's cache. Alternatively, the CACO can notify and configure the previous node (e.g., P4 switch sitting behind the multi-socket server) in the network to distribute the traffic based the decision made at previous step. The last two steps can be done by weighted traffic redirection.

Figure 9A:
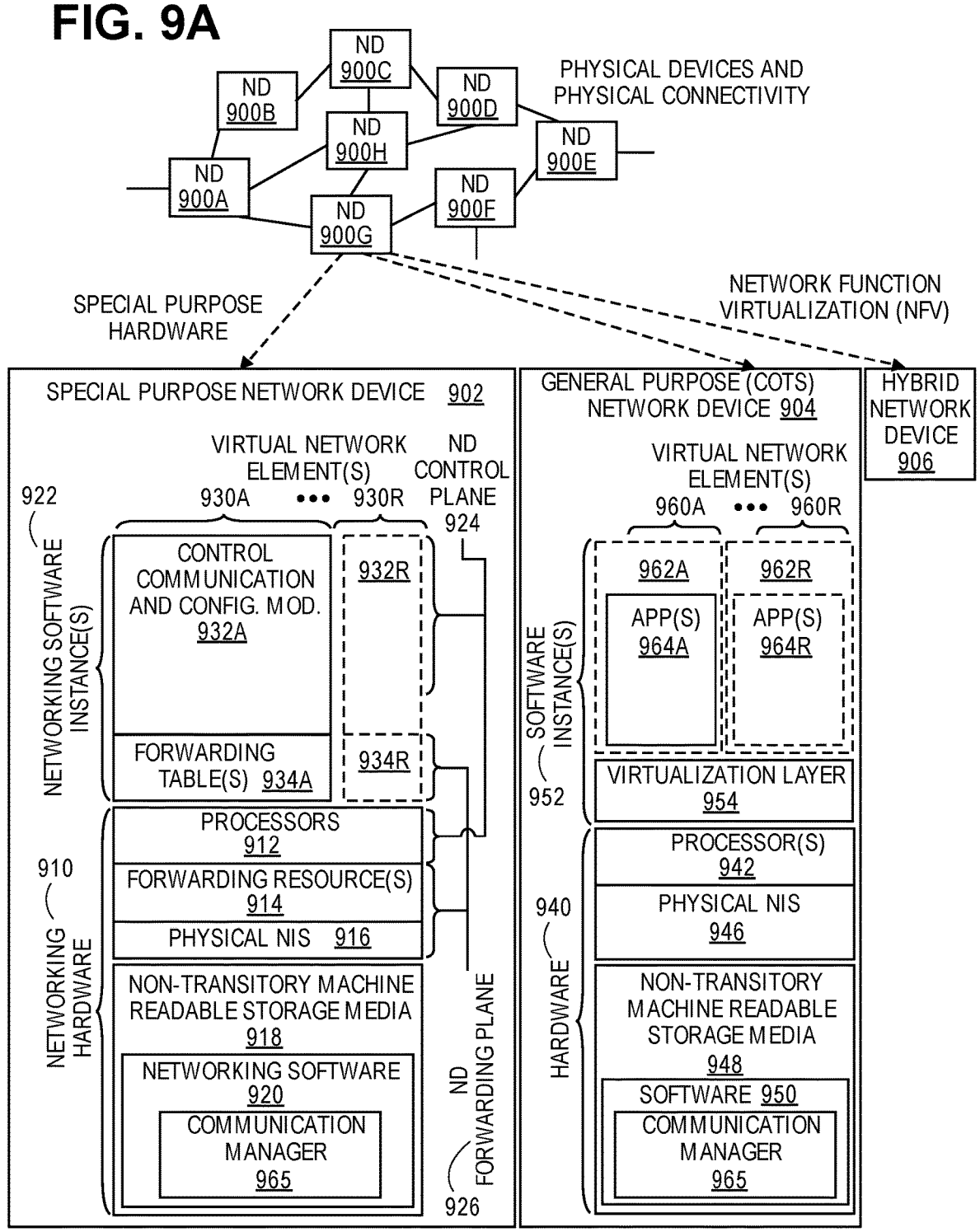
FIG. 9A illustrates connectivity between network devices (NDs) within an exemplary network, as well as three exemplary implementations of the NDs, according to some embodiments of the invention.

FIG. 9A illustrates connectivity between network devices (NDs) within an exemplary network, as well as three exemplary implementations of the NDs, according to some embodiments of the invention. FIG. 9A shows NDs 900A-H, and their connectivity by way of lines between 900A-900B, 900B-900C, 900C-900D, 900D-900E, 900E-900F, 900F-900G, and 900A-900G, as well as between 900H and each of 900A, 900C, 900D, and 900G. These NDs are physical devices, and the connectivity between these NDs can be wireless or wired (often referred to as a link). An additional line extending from NDs 900A, 900E, and 900F illustrates that these NDs act as ingress and egress points for the network (and thus, these NDs are sometimes referred to as edge NDs; while the other NDs may be called core NDs).

Two of the exemplary ND implementations in FIG. 9A are: 1) a special-purpose network device 902 that uses custom application-specific integrated-circuits (ASICs) and a special-purpose operating system (OS); and 2) a general purpose network device 904 that uses common off-the-shelf (COTS) processors and a standard OS.

The special-purpose network device 902 includes networking hardware 910 comprising a set of one or more processor(s) 912, forwarding resource(s) 914 (which typically include one or more ASICs and/or network processors), and physical network interfaces (NIs) 916 (through which network connections are made, such as those shown by the connectivity between NDs 900A-H), as well as non-transitory machine readable storage media 918 having stored therein networking software 920. During operation, the networking software 920 may be executed by the networking hardware 910 to instantiate a set of one or more networking software instance(s) 922. Each of the networking software instance(s) 922, and that part of the networking hardware 910 that executes that network software instance (be it hardware dedicated to that networking software instance and/or time slices of hardware temporally shared by that networking software instance with others of the networking software instance(s) 922), form a separate virtual network element 930A-R. Each of the virtual network element(s) (VNEs) 930A-R includes a control communication and configuration module 932A-R (sometimes referred to as a local control module or control communication module) and forwarding table(s) 934A-R, such that a given virtual network element (e.g., 930A) includes the control communication and configuration module (e.g., 932A), a set of one or more forwarding table(s) (e.g., 934A), and that portion of the networking hardware 910 that executes the virtual network element (e.g., 930A).

In some embodiments, a CACO 965 can be included with the networking software 920 or similar software stored in the non-transitory machine readable storage media 918. The CACO 965 performs the functions described herein to enable cache pooling in multi-socket systems, disaggregated architectures, and similar systems.

The special-purpose network device 902 is often physically and/or logically considered to include: 1) a ND control plane 924 (sometimes referred to as a control plane) comprising the processor(s) 912 that execute the control communication and configuration module(s) 932A-R; and 2) a ND forwarding plane 926 (sometimes referred to as a forwarding plane, a data plane, or a media plane) comprising the forwarding resource(s) 914 that utilize the forwarding table(s) 934A-R and the physical NIs 916. By way of example, where the ND is a router (or is implementing routing functionality), the ND control plane 924 (the processor(s) 912 executing the control communication and configuration module(s) 932A-R) is typically responsible for participating in controlling how data (e.g., packets) is to be routed (e.g., the next hop for the data and the outgoing physical NI for that data) and storing that routing information in the forwarding table(s) 934A-R, and the ND forwarding plane 926 is responsible for receiving that data on the physical NIs 916 and forwarding that data out the appropriate ones of the physical NIs 916 based on the forwarding table(s) 934A-R.

Figure 9B:
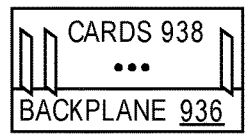
FIG. 9B illustrates an exemplary way to implement a special-purpose network device according to some embodiments of the invention.

FIG. 9B illustrates an exemplary way to implement the special-purpose network device 902 according to some embodiments of the invention. FIG. 9B shows a special-purpose network device including cards 938 (typically hot pluggable). While in some embodiments the cards 938 are of two types (one or more that operate as the ND forwarding plane 926 (sometimes called line cards), and one or more that operate to implement the ND control plane 924 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 936 (e.g., a first full mesh coupling the line cards and a second full mesh coupling all of the cards).

Returning to FIG. 9A, the general purpose network device 904 includes hardware 940 comprising a set of one or more processor(s) 942 (which are often COTS processors) and physical NIs 946, as well as non-transitory machine readable storage media 948 having stored therein software 950. During operation, the processor(s) 942 execute the software 950 to instantiate one or more sets of one or more applications 964A-R. While one embodiment does not implement virtualization, alternative embodiments may use different forms of virtualization. For example, in one such alternative embodiment the virtualization layer 954 represents the kernel of an operating system (or a shim executing on a base operating system) that allows for the creation of multiple instances 962A-R called software containers that may each be used to execute one (or more) of the sets of applications 964A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 954 represents a hypervisor (sometimes referred to as a virtual machine monitor (VMM)) or a hypervisor executing on top of a host operating system, and each of the sets of applications 964A-R is run on top of a guest operating system within an instance 962A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 940, directly on a hypervisor (in which case the unikernel is sometimes described as running within a LibOS virtual machine), or in a software container, embodiments can be implemented fully with unikernels running directly on a hypervisor represented by virtualization layer 954, unikernels running within software containers represented by instances 962A-R, or as a combination of unikernels and the above-described techniques (e.g., unikernels and virtual machines both run directly on a hypervisor, unikernels and sets of applications that are run in different software containers).

In some embodiments, a CACO 965 can be included with the software 950 or similar software stored in the non-transitory machine readable storage media 948. The CACO 965 performs the functions described herein to enable cache pooling in multi-socket systems, disaggregated architectures, and similar systems.

The instantiation of the one or more sets of one or more applications 964A-R, as well as virtualization if implemented, are collectively referred to as software instance(s) 952. Each set of applications 964A-R, corresponding virtualization construct (e.g., instance 962A-R) if implemented, and that part of the hardware 940 that executes them (be it hardware dedicated to that execution and/or time slices of hardware temporally shared), forms a separate virtual network element(s) 960A-R.

The virtual network element(s) 960A-R perform similar functionality to the virtual network element(s) 930A-R—e.g., similar to the control communication and configuration module(s) 932A and forwarding table(s) 934A (this virtualization of the hardware 940 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). While embodiments of the invention are illustrated with each instance 962A-R corresponding to one VNE 960A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 962A-R to VNEs also apply to embodiments where such a finer level of granularity and/or unikernels are used.

In certain embodiments, the virtualization layer 954 includes a virtual switch that provides similar forwarding services as a physical Ethernet switch. Specifically, this virtual switch forwards traffic between instances 962A-R and the physical NI(s) 946, as well as optionally between the instances 962A-R; in addition, this virtual switch may enforce network isolation between the VNEs 960A-R that by policy are not permitted to communicate with each other (e.g., by honoring virtual local area networks (VLANs)).

The third exemplary ND implementation in FIG. 9A is a hybrid network device 906, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 902) could provide for para-virtualization to the networking hardware present in the hybrid network device 906.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also, in all of the above exemplary implementations, each of the VNEs (e.g., VNE(s) 930A-R, VNEs 960A-R, and those in the hybrid network device 906) receives data on the physical NIs (e.g., 916, 946) and forwards that data out the appropriate ones of the physical NIs (e.g., 916, 946). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

Figure 9C:
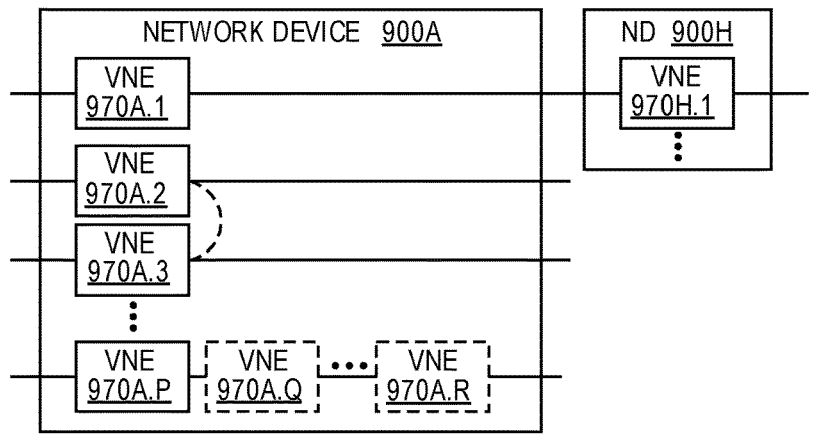
FIG. 9C illustrates various exemplary ways in which virtual network elements (VNEs) may be coupled according to some embodiments of the invention.

FIG. 9C illustrates various exemplary ways in which VNEs may be coupled according to some embodiments of the invention. FIG. 9C shows VNEs 970A.1-970A.P (and optionally VNEs 970A.Q-970A.R) implemented in ND 900A and VNE 970H.1 in ND 900H. In FIG. 9C, VNEs 970A.1-P are separate from each other in the sense that they can receive packets from outside ND 900A and forward packets outside of ND 900A; VNE 970A.1 is coupled with VNE 970H.1, and thus they communicate packets between their respective NDs; VNE 970A.2-970A.3 may optionally forward packets between themselves without forwarding them outside of the ND 900A; and VNE 970A.P may optionally be the first in a chain of VNEs that includes VNE 970A.Q followed by VNE 970A.R (this is sometimes referred to as dynamic service chaining, where each of the VNEs in the series of VNEs provides a different service— e.g., one or more layer 4-7 network services). While FIG. 9C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 9A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 9A may also host one or more such servers (e.g., in the case of the general purpose network device 904, one or more of the software instances 962A-R may operate as servers; the same would be true for the hybrid network device 906; in the case of the special-purpose network device 902, one or more such servers could also be run on a virtualization layer executed by the processor(s) 912); in which case the servers are said to be co-located with the VNEs of that ND.

A virtual network is a logical abstraction of a physical network (such as that in FIG. 9A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

Figure 9D:
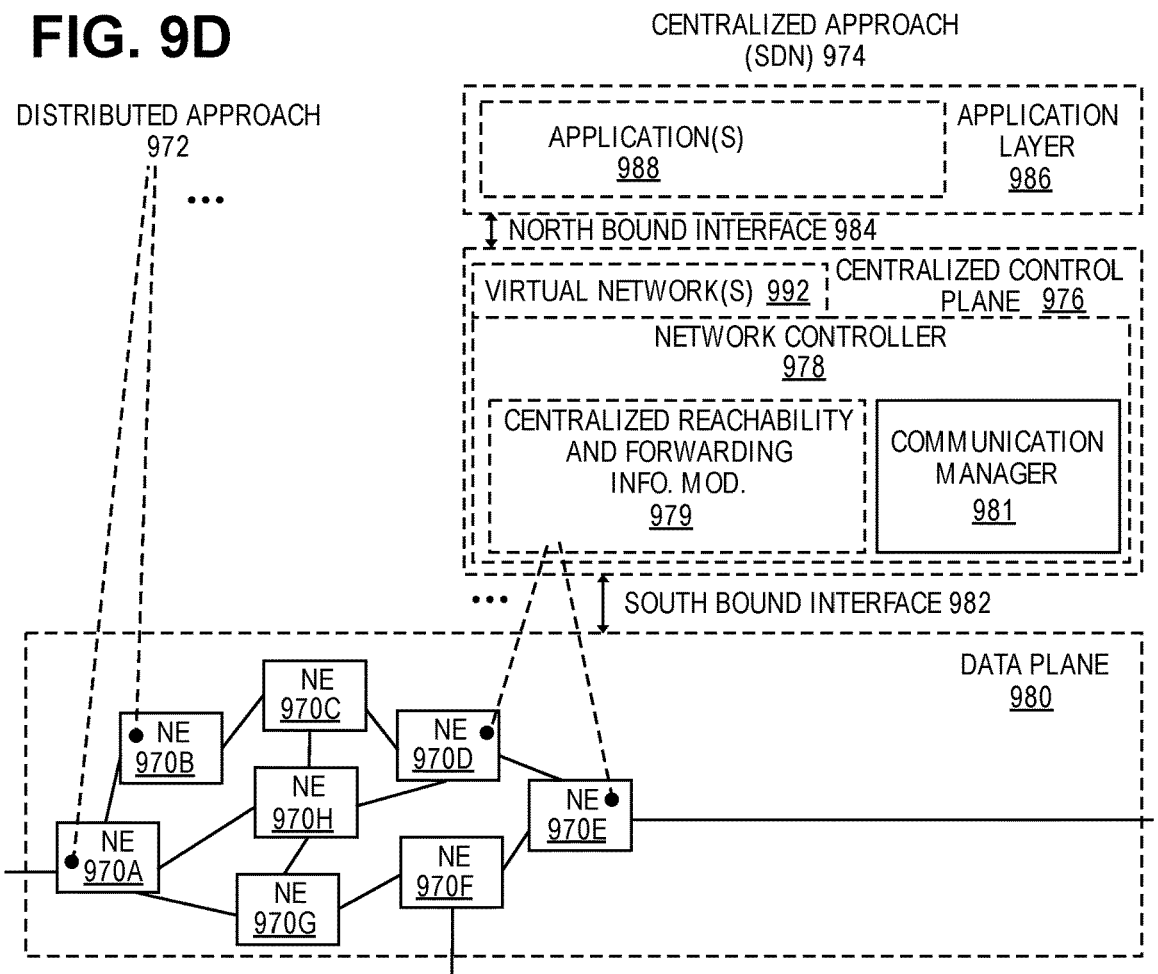
FIG. 9D illustrates a network with a single network element (NE) on each of the NDs, and within this straightforward approach contrasts a traditional distributed approach (commonly used by traditional routers) with a centralized approach for maintaining reachability and forwarding information (also called network control), according to some embodiments of the invention.

FIG. 9D illustrates a network with a single network element on each of the NDs of FIG. 9A, and within this straightforward approach contrasts a traditional distributed approach (commonly used by traditional routers) with a centralized approach for maintaining reachability and forwarding information (also called network control), according to some embodiments of the invention. Specifically, FIG. 9D illustrates network elements (NEs) 970A-H with the same connectivity as the NDs 900A-H of FIG. 9A.

FIG. 9D illustrates that the distributed approach 972 distributes responsibility for generating the reachability and forwarding information across the NEs 970A-H; in other words, the process of neighbor discovery and topology discovery is distributed.

For example, where the special-purpose network device 902 is used, the control communication and configuration module(s) 932A-R of the ND control plane 924 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (including RSVP-Traffic Engineering (TE): Extensions to RSVP for LSP Tunnels and Generalized Multi-Protocol Label Switching (GMPLS) Signaling RSVP-TE)) that communicate with other NEs to exchange routes, and then selects those routes based on one or more routing metrics. Thus, the NEs 970A-H (e.g., the processor(s) 912 executing the control communication and configuration module(s) 932A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 924. The ND control plane 924 programs the ND forwarding plane 926 with information (e.g., adjacency and route information) based on the routing structure(s). For example, the ND control plane 924 programs the adjacency and route information into one or more forwarding table(s) 934A-R (e.g., Forwarding Information Base (FIB), Label Forwarding Information Base (LFIB), and one or more adjacency structures) on the ND forwarding plane 926. For layer 2 forwarding, the ND can store one or more bridging tables that are used to forward data based on the layer 2 information in that data. While the above example uses the special-purpose network device 902, the same distributed approach 972 can be implemented on the general purpose network device 904 and the hybrid network device 906.

FIG. 9D illustrates that a centralized approach 974 (also known as software defined networking (SDN)) that decouples the system that makes decisions about where traffic is sent from the underlying systems that forwards traffic to the selected destination. The illustrated centralized approach 974 has the responsibility for the generation of reachability and forwarding information in a centralized control plane 976 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 976 has a south bound interface 982 with a data plane 980 (sometime referred to the infrastructure layer, network forwarding plane, or forwarding plane (which should not be confused with a ND forwarding plane)) that includes the NEs 970A-H (sometimes referred to as switches, forwarding elements, data plane elements, or nodes). The centralized control plane 976 includes a network controller 978, which includes a centralized reachability and forwarding information module 979 that determines the reachability within the network and distributes the forwarding information to the NEs 970A-H of the data plane 980 over the south bound interface 982 (which may use the OpenFlow protocol). Thus, the network intelligence is centralized in the centralized control plane 976 executing on electronic devices that are typically separate from the NDs.

In some embodiments, a CACO 981 can be included with the network controller 978 or similar software implemented at the centralized control plane 976. The CACO 981 performs the functions described herein to enable cache pooling in multi-socket systems, disaggregated architectures, and similar systems in a distributed approach (e.g., SDN).

For example, where the special-purpose network device 902 is used in the data plane 980, each of the control communication and configuration module(s) 932A-R of the ND control plane 924 typically include a control agent that provides the VNE side of the south bound interface 982. In this case, the ND control plane 924 (the processor(s) 912 executing the control communication and configuration module(s) 932A-R) performs its responsibility for participating in controlling how data (e.g., packets) is to be routed (e.g., the next hop for the data and the outgoing physical NI for that data) through the control agent communicating with the centralized control plane 976 to receive the forwarding information (and in some cases, the reachability information) from the centralized reachability and forwarding information module 979 (it should be understood that in some embodiments of the invention, the control communication and configuration module(s) 932A-R, in addition to communicating with the centralized control plane 976, may also play some role in determining reachability and/or calculating forwarding information—albeit less so than in the case of a distributed approach; such embodiments are generally considered to fall under the centralized approach 974, but may also be considered a hybrid approach).

While the above example uses the special-purpose network device 902, the same centralized approach 974 can be implemented with the general purpose network device 904 (e.g., each of the VNE 960A-R performs its responsibility for controlling how data (e.g., packets) is to be routed (e.g., the next hop for the data and the outgoing physical NI for that data) by communicating with the centralized control plane 976 to receive the forwarding information (and in some cases, the reachability information) from the centralized reachability and forwarding information module 979; it should be understood that in some embodiments of the invention, the VNEs 960A-R, in addition to communicating with the centralized control plane 976, may also play some role in determining reachability and/or calculating forwarding information—albeit less so than in the case of a distributed approach) and the hybrid network device 906. In fact, the use of SDN techniques can enhance the NFV techniques typically used in the general purpose network device 904 or hybrid network device 906 implementations as NFV is able to support SDN by providing an infrastructure upon which the SDN software can be run, and NFV and SDN both aim to make use of commodity server hardware and physical switches.

FIG. 9D also shows that the centralized control plane 976 has a north bound interface 984 to an application layer 986, in which resides application(s) 988. The centralized control plane 976 has the ability to form virtual networks 992 (sometimes referred to as a logical forwarding plane, network services, or overlay networks (with the NEs 970A-H of the data plane 980 being the underlay network)) for the application(s) 988. Thus, the centralized control plane 976 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 9D shows the distributed approach 972 separate from the centralized approach 974, the effort of network control may be distributed differently or the two combined in certain embodiments of the invention. For example: 1) embodiments may generally use the centralized approach (SDN) 974, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 974 but may also be considered a hybrid approach.

While FIG. 9D illustrates the simple case where each of the NDs 900A-H implements a single NE 970A-H, it should be understood that the network control approaches described with reference to FIG. 9D also work for networks where one or more of the NDs 900A-H implement multiple VNEs (e.g., VNEs 930A-R, VNEs 960A-R, those in the hybrid network device 906). Alternatively, or in addition, the network controller 978 may also emulate the implementation of multiple VNEs in a single ND. Specifically, instead of (or in addition to) implementing multiple VNEs in a single ND, the network controller 978 may present the implementation of a VNE/NE in a single ND as multiple VNEs in the virtual networks 992 (all in the same one of the virtual network(s) 992, each in different ones of the virtual network(s) 992, or some combination). For example, the network controller 978 may cause an ND to implement a single VNE (a NE) in the underlay network, and then logically divide up the resources of that NE within the centralized control plane 976 to present different VNEs in the virtual network(s) 992 (where these different VNEs in the overlay networks are sharing the resources of the single VNE/NE implementation on the ND in the underlay network).

Figure 9E:
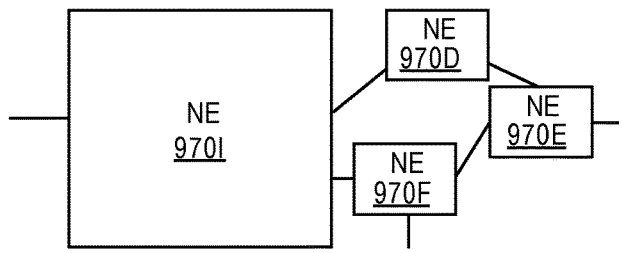
FIG. 9E illustrates the simple case of where each of the NDs implements a single NE, but a centralized control plane has abstracted multiple of the NEs in different NDs into (to represent) a single NE in one of the virtual network(s), according to some embodiments of the invention.
Figure 9F:
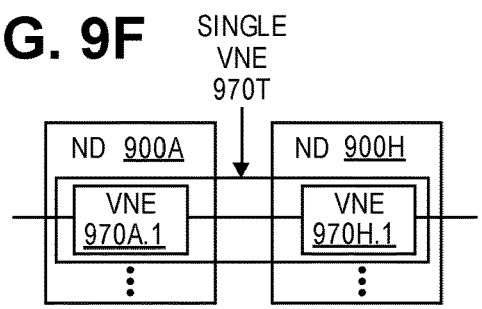
FIG. 9F illustrates a case where multiple VNEs are implemented on different NDs and are coupled to each other, and where a centralized control plane has abstracted these multiple VNEs such that they appear as a single VNE within one of the virtual networks, according to some embodiments of the invention.

On the other hand, FIGS. 9E and 9F respectively illustrate exemplary abstractions of NEs and VNEs that the network controller 978 may present as part of different ones of the virtual networks 992. FIG. 9E illustrates the simple case of where each of the NDs 900A-H implements a single NE 970A-H (see FIG. 9D), but the centralized control plane 976 has abstracted multiple of the NEs in different NDs (the NEs 970A-C and G-H) into (to represent) a single NE 9701 in one of the virtual network(s) 992 of FIG. 9D, according to some embodiments of the invention. FIG. 9E shows that in this virtual network, the NE 9701 is coupled to NE 970D and 970F, which are both still coupled to NE 970E.

FIG. 9F illustrates a case where multiple VNEs (VNE 970A.1 and VNE 970H.1) are implemented on different NDs (ND 900A and ND 900H) and are coupled to each other, and where the centralized control plane 976 has abstracted these multiple VNEs such that they appear as a single VNE 970T within one of the virtual networks 992 of FIG. 9D, according to some embodiments of the invention. Thus, the abstraction of a NE or VNE can span multiple NDs.

While some embodiments of the invention implement the centralized control plane 976 as a single entity (e.g., a single instance of software running on a single electronic device), alternative embodiments may spread the functionality across multiple entities for redundancy and/or scalability purposes (e.g., multiple instances of software running on different electronic devices).

Figure 10:
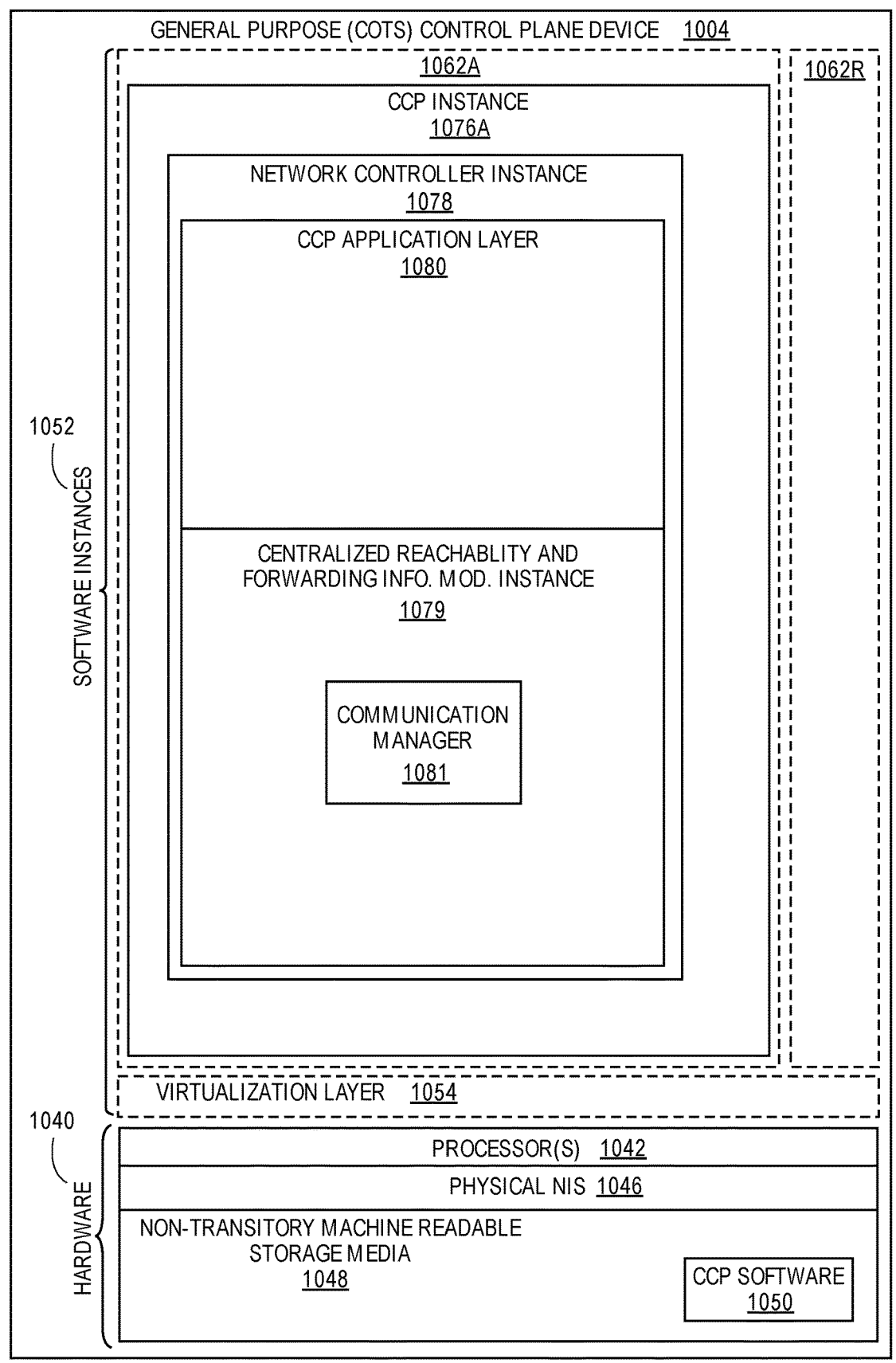
FIG. 10 illustrates a general purpose control plane device with centralized control plane (CCP) software 1050, according to some embodiments of the invention.

Similar to the network device implementations, the electronic device(s) running the centralized control plane 976, and thus the network controller 978 including the centralized reachability and forwarding information module 979, may be implemented a variety of ways (e.g., a special purpose device, a general-purpose (e.g., COTS) device, or hybrid device). These electronic device(s) would similarly include processor(s), a set of one or more physical NIs, and a non-transitory machine-readable storage medium having stored thereon the centralized control plane software. For instance, FIG. 10 illustrates, a general purpose control plane device 1004 including hardware 1040 comprising a set of one or more processor(s) 1042 (which are often COTS processors) and physical NIs 1046, as well as non-transitory machine readable storage media 1048 having stored therein centralized control plane (CCP) software 1050.

In some embodiments, a CACO 1081 can be included with the control plane software or similar software stored in the non-transitory machine readable storage media 1048. The CACO 965 performs the functions described herein to enable cache pooling in multi-socket systems, disaggregated architectures, and similar systems.

In embodiments that use compute virtualization, the processor(s) 1042 typically execute software to instantiate a virtualization layer 1054 (e.g., in one embodiment the virtualization layer 1054 represents the kernel of an operating system (or a shim executing on a base operating system) that allows for the creation of multiple instances 1062A-R called software containers (representing separate user spaces and also called virtualization engines, virtual private servers, or jails) that may each be used to execute a set of one or more applications; in another embodiment the virtualization layer 1054 represents a hypervisor (sometimes referred to as a virtual machine monitor (VMM)) or a hypervisor executing on top of a host operating system, and an application is run on top of a guest operating system within an instance 1062A-R called a virtual machine (which in some cases may be considered a tightly isolated form of software container) that is run by the hypervisor; in another embodiment, an application is implemented as a unikernel, which can be generated by compiling directly with an application only a limited set of libraries (e.g., from a library operating system (LibOS) including drivers/libraries of OS services) that provide the particular OS services needed by the application, and the unikernel can run directly on hardware 1040, directly on a hypervisor represented by virtualization layer 1054 (in which case the unikernel is sometimes described as running within a LibOS virtual machine), or in a software container represented by one of instances 1062A-R). Again, in embodiments where compute virtualization is used, during operation an instance of the CCP software 1050 (illustrated as CCP instance 1076A) is executed (e.g., within the instance 1062A) on the virtualization layer 1054. In embodiments where compute virtualization is not used, the CCP instance 1076A is executed, as a unikernel or on top of a host operating system, on the "bare metal" general purpose control plane device 1004. The instantiation of the CCP instance 1076A, as well as the virtualization layer 1054 and instances 1062A-R if implemented, are collectively referred to as software instance(s) 1052.

In some embodiments, the CCP instance 1076A includes a network controller instance 1078. The network controller instance 1078 includes a centralized reachability and forwarding information module instance 1079 (which is a middleware layer providing the context of the network controller 978 to the operating system and communicating with the various NEs), and an CCP application layer 1080 (sometimes referred to as an application layer) over the middleware layer (providing the intelligence required for various network operations such as protocols, network situational awareness, and user-interfaces). At a more abstract level, this CCP application layer 1080 within the centralized control plane 976 works with virtual network view(s) (logical view(s) of the network) and the middleware layer provides the conversion from the virtual networks to the physical view.

The centralized control plane 976 transmits relevant messages to the data plane 980 based on CCP application layer 1080 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 980 may receive different messages, and thus different forwarding information. The data plane 980 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 980, the packet (or a subset of the packet header and content) is typically forwarded to the centralized control plane 976. The centralized control plane 976 will then program forwarding table entries into the data plane 980 to accommodate packets belonging to the flow of the unknown packet. Once a specific forwarding table entry has been programmed into the data plane 980 by the centralized control plane 976, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method of cache pooling from a pool of processors connected to a top of rack (ToR) switch at a disaggregated data center, the method comprising:
receiving an application identifier for an application to be executed by a primary processor from the pool of processors and a processor identifier of the primary processor assigned to execute the application;
storing the application identifier and the processor identifier of the primary processor as an entry in a cache coordinator (CACO) table associated with the ToR switch;
determining whether a primary processor cache of the primary processor assigned to execute the application has insufficient cache storage space to allot for the application;
selecting at least one alternative processor from the pool of processors based on a cache availability or metric for each processor from a list of alternative processors to share cache storage space with the primary processor for executing the application;
storing respective processor identifier of the at least one alternative processor selected to share cache storage space with the primary processor in the entry of the CACO table;
configuring the primary processor and the selected at least one alternative processor for mutual cache visibility; and
configuring routing of traffic to the application to be divided between the primary processor cache and the selected at least one alternative processor cache based on the entry of the CACO table.

2. The method of claim 1, further comprising:
retrieving the list of alternative processors from the entry for the application in the CACO table.

3. The method of claim 1, further comprising:
determining an amount of cache storage space to utilized for the selected at least one alternative processor; and
isolating the amount of cache storage space for the application at the selected at least one alternative processor.

4. The method of claim 1, further comprising:
determining the application and the primary processor for the application to handle a received data to be processed.

5. The method of claim 4, wherein the received data is an Input/Output (I/O) packet or a data received from a solid state drive via PCIe.

6. The method of claim 1, further comprising:
receiving a priority of the application; and
storing the priority of the application in the entry for the application in the CACO table.

7. The method of claim 1, further comprising:
configuring the primary processor and the selected at least one alternative processor for mutual visibility.

8. The method of claim 1, further comprising:
configuring routing of traffic for the application to be divided between the primary processor cache and cache of the selected at least one alternative processor.

9. The method of claim 1, wherein the primary processor cache is any one or more of a static random access memory, a dynamic random access memory, or a high bandwidth memory.

10. The method of claim 1, further comprising:
placing data in main memory where additional cache storage space is not available in the list of alternative processors.

11. The method of claim 1, wherein the metric includes any one or more of bandwidth, a number of running applications on alternative processors, or relative priorities of applications on different alternative processors.

12. An electronic device for cache pooling from a pool of processors connected to a top of rack (ToR) switch at a disaggregated data center comprising:
a machine-readable storage medium having stored therein a cache coordinator (CACO); and
a processor coupled to the machine-readable storage medium, the processor to execute the (CACO) to perform operations to:
receive an application identifier for an application to be executed by a primary processor from the pool of processors and a processor identifier of the primary processor assigned to execute the application;
store the application identifier and the processor identifier of the primary processor as an entry in a (CACO) table associated with the ToR switch;
determine whether a primary processor cache of the primary processor assigned to execute the application has insufficient cache storage space to allot for the application;
select at least one alternative processor from the pool of processors based on a cache availability or metric for each processor from a list of alternative processors to share cache storage space with the primary processor for executing the application;
store respective processor identifier of the at least one alternative processor selected to share cache storage space with the primary processor in the entry of the CACO table;
configure the primary processor and the selected at least one alternative processor for mutual cache visibility; and
configure routing of traffic to the application to be divided between the primary processor cache and the selected at least one alternative processor cache based on the entry of the CACO table.

13. The electronic device of claim 12, wherein the operations further to:
retrieve the list of alternative processors from the entry for the application in the CACO table.

14. The electronic device of claim 12, wherein the operations further to:
determine an amount of cache storage space to utilized for the selected at least one alternative processor; and
isolate the amount of cache storage space for the application at the selected at least one alternative processor.

15. The electronic device of claim 12, wherein the operations further to:
determine primary processor for the application to handle a received data to be processed.

16. The electronic device of claim 15, wherein the received data is an Input/Output (I/O) packet or a data received from a solid state drive via PCIe.

17. The electronic device of claim 12, wherein the operations further to:
- receive a priority of the application; and
- store the priority of the application in the entry for the application in the CACO table.

18. The electronic device of claim 12, wherein the operations further to:
- configure the primary processor and the selected at least one alternative processor for mutual visibility.

* * * * *